United States Patent [19]

Takashima et al.

[11] Patent Number: 5,633,761
[45] Date of Patent: May 27, 1997

[54] LASER DIODE MODULE

[75] Inventors: Yuichirou Takashima; Kozo Yamazaki; Mitsuharu Ishii; Toshimitsu Kumagai; Masanori Ohkawa, all of Kawasaki, Japan

[73] Assignee: Fujitsu Limited, Kawasaki, Japan

[21] Appl. No.: 475,506

[22] Filed: Jun. 7, 1995

Related U.S. Application Data

[62] Division of Ser. No. 88,647, Jul. 9, 1993.

[30] Foreign Application Priority Data

Jul. 10, 1992 [JP] Japan ............................ 4-183968

[51] Int. Cl.$^6$ .................................. G02B 7/02; H01S 3/02
[52] U.S. Cl. ........................ 359/811; 359/652; 372/36; 372/108; 372/109
[58] Field of Search .......................... 359/669, 652, 359/811; 372/36, 69, 109, 108; 250/238

[56] References Cited

U.S. PATENT DOCUMENTS

| | | | |
|---|---|---|---|
| 5,159,193 | 10/1992 | Shiraishi et al. | 250/238 |
| 5,239,414 | 8/1993 | Reno | 359/669 |
| 5,333,145 | 7/1994 | Hyuga et al. | 372/69 |
| 5,341,246 | 8/1994 | Oono et al. | 359/669 |

FOREIGN PATENT DOCUMENTS

| | | |
|---|---|---|
| 0255305 | 2/1988 | European Pat. Off. |
| 59-146013 | 8/1984 | Japan. |
| 60-153560 | 10/1985 | Japan. |
| 60-241013 | 11/1985 | Japan. |
| 63-316822 | 12/1988 | Japan. |
| 2-025810 | 1/1990 | Japan. |
| 5-243688 | 9/1993 | Japan. |

OTHER PUBLICATIONS

Nakamura et al., "Optical Pickup," Patent Abstracts of Japan, vol. 10, No. 110, (P–450), Apr. 24, 1986 & JP–A–60 241 013 (Matsushita Denki Sangyo KK), Nov. 29, 1985.

Shikama et al., "Optical Head Device," Patent Abstracts of Japan, vol. 11, No. 354 (P–638), Nov. 19, 1987 & JP–A–62 132 247 (Mitsubishi Electric Corp), Jun. 15, 1987.

Sumi, "Light Beam Scanning Device," Patent Abstracts of Japan, vol. 13, No. 159 (P–858), Apr. 18, 1989 & JP–A–63 316 819 (Fuji Photo Film Co Ltd), Dec. 26, 1988.

Kondo et al., "Semiconductor Laser Device," Patent Abstracts of Japan, vol. 14, No. 421 (P–976), Sep. 11, 1990 & JP–A–02 162 787 (Foster Electric Co Ltd), Jun. 22, 1990.

Kenmochi, "Optical Pickup," Patent Abstracts of Japan, vol. 15, No. 51 (P–1163), Feb. 6, 1991 & JP–A–02 282 (Seiko Epson Corp), Nov. 20, 1990.

*Primary Examiner*—James W. Davie
*Attorney, Agent, or Firm*—Staas & Halsey

[57] ABSTRACT

A laser diode module includes a laser diode emitting a laser beam, and a lens for collimating the laser beam. The lens is tilted with respect to an optical axis along which the laser beam is propagated.

31 Claims, 26 Drawing Sheets

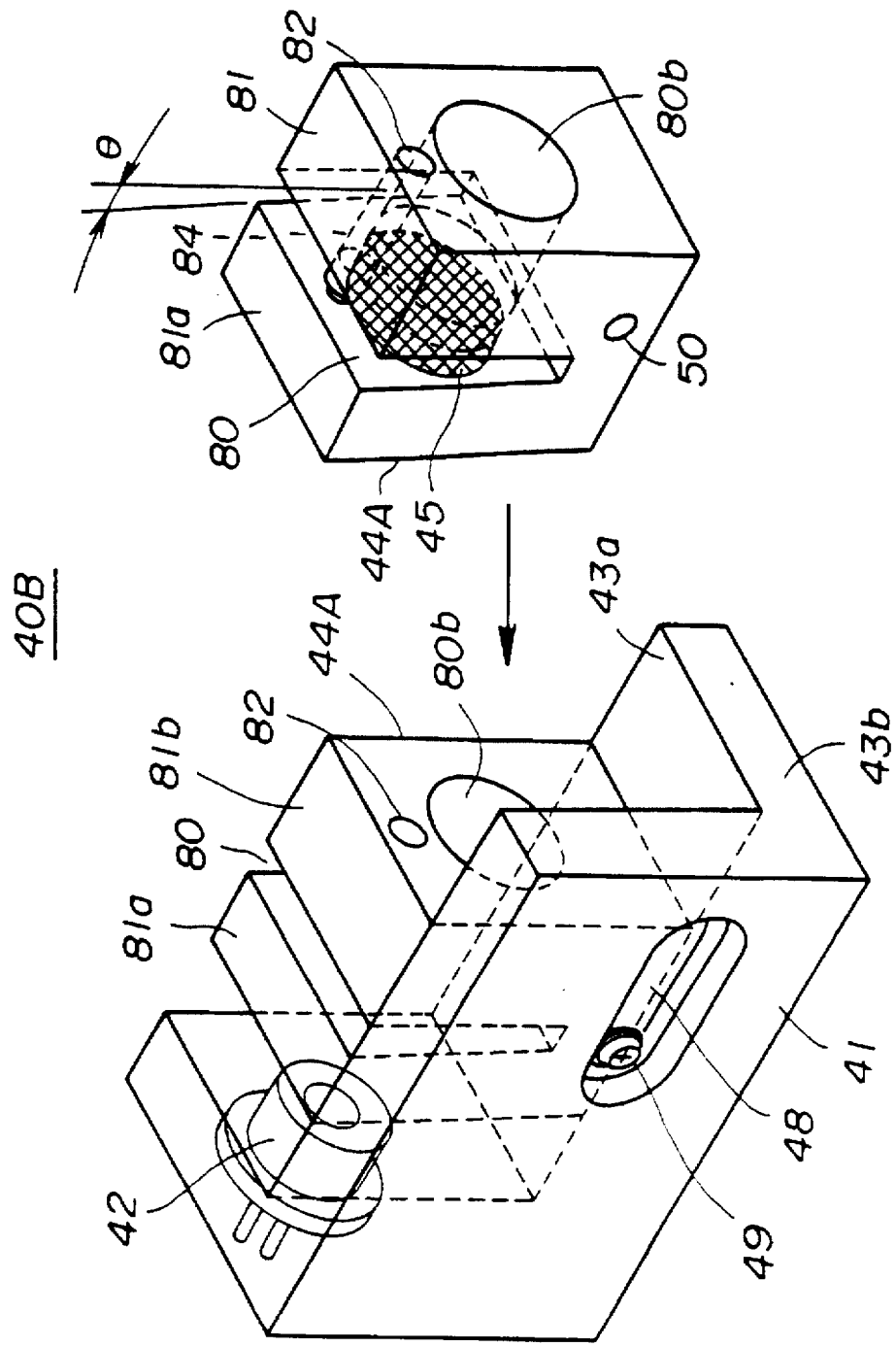

LASER DIODE MODULE

This application is a division of application Ser. No. 08/088,647, filed Jul. 9, 1993, now pending.

BACKGROUND OF THE INVENTION

1. Field of the Invention

The present invention generally relates to laser diode modules and, more particularly, to a laser diode module suitably applied to a bar code reader in which a laser diode is used as a light source.

2. Description of the Prior Art

Various types of laser sources have been proposed. In the past, a He—Ne laser was widely used. Recently, semiconductor laser diodes have been proposed and applied to various fields as light sources. Such semiconductor laser diodes contribute to down-sizing of various devices.

A bar code reader that optically reads a bar code uses a semiconductor laser diode (hereinafter, simply referred to as a laser diode). Normally, a laser diode is combined with optical elements such as lenses, and a laser diode module made up of the laser diode and the optical elements is provided as a light source. A light emitted from the laser diode is optically processed by the optical elements of the laser diode module and is projected onto a bar code via an optical scanning system outside of the laser diode module.

The performance of the bar code reader greatly depends on the performance of the laser diode module. Conventionally, a complex adjustment mechanism is employed in the laser diode module in order to improve the performance thereof. For example, such an adjustment mechanism is designed to adjust the positions of optical elements, such as lenses. By way of another example, a plurality of optical elements are used to improve the performance of the laser diode module.

From the above viewpoints, it is required to provide a simple laser diode module capable of providing good performance by a simple adjustment mechanism.

SUMMARY OF THE INVENTION

It is an object of the present invention to provide a simple laser diode module capable of providing good performance by a simple adjustment mechanism.

The above object of the present invention is achieved by a laser diode module comprising: a laser diode emitting a laser beam; and a lens for collimating the laser beam, the lens being tilted with respect to an optical axis along which the laser beam is propagated.

It is preferable that the laser diode module comprises a base which holds the laser diode; and a lens holder which holds the lens so that a tilt angle of the lens with respect to the optical axis can be adjusted and which is mounted on the base.

It is also preferable that the laser diode module comprises a base which holds the laser diode and has a mounting surface; a lens holder which holds the lens and is slidably mounted on the mounting surface; and a mechanism which tilts the lens holder with respect to the mounting surface of the base so that the lens is tilted with respect to the optical axis.

It is also preferable that the laser diode module comprises: a base holding the laser diode and having a mounting surface; a first lens holder holding the lens; and a second holder slidably mounted on the mounting surface of the base. The first lens holder has a first through hole in which the lens is placed. The second holder has a second hole, into which the first lens holder is inserted, and two third holes joined to the first through hole and formed on respective sides of the first through hole. The laser beam emitted from the laser diode is propagated through one of the two third holes, a part of the second hole, the lens, a remaining part of the second hole, and the other one of the two third holes.

BRIEF DESCRIPTION OF THE DRAWINGS

Other objects, features and advantages of the present invention will become more apparent from the following detailed description when read in conjunction with the accompanying drawings, in which:

FIG. 11C is a perspective view of the laser diode module shown in FIGS. 11A and 11B;

DESCRIPTION OF THE PREFERRED EMBODIMENTS

In order to facilitate understanding of the present invention, a description will now be given, with reference to FIG. 1, of a bar code reader.

Figure 1:
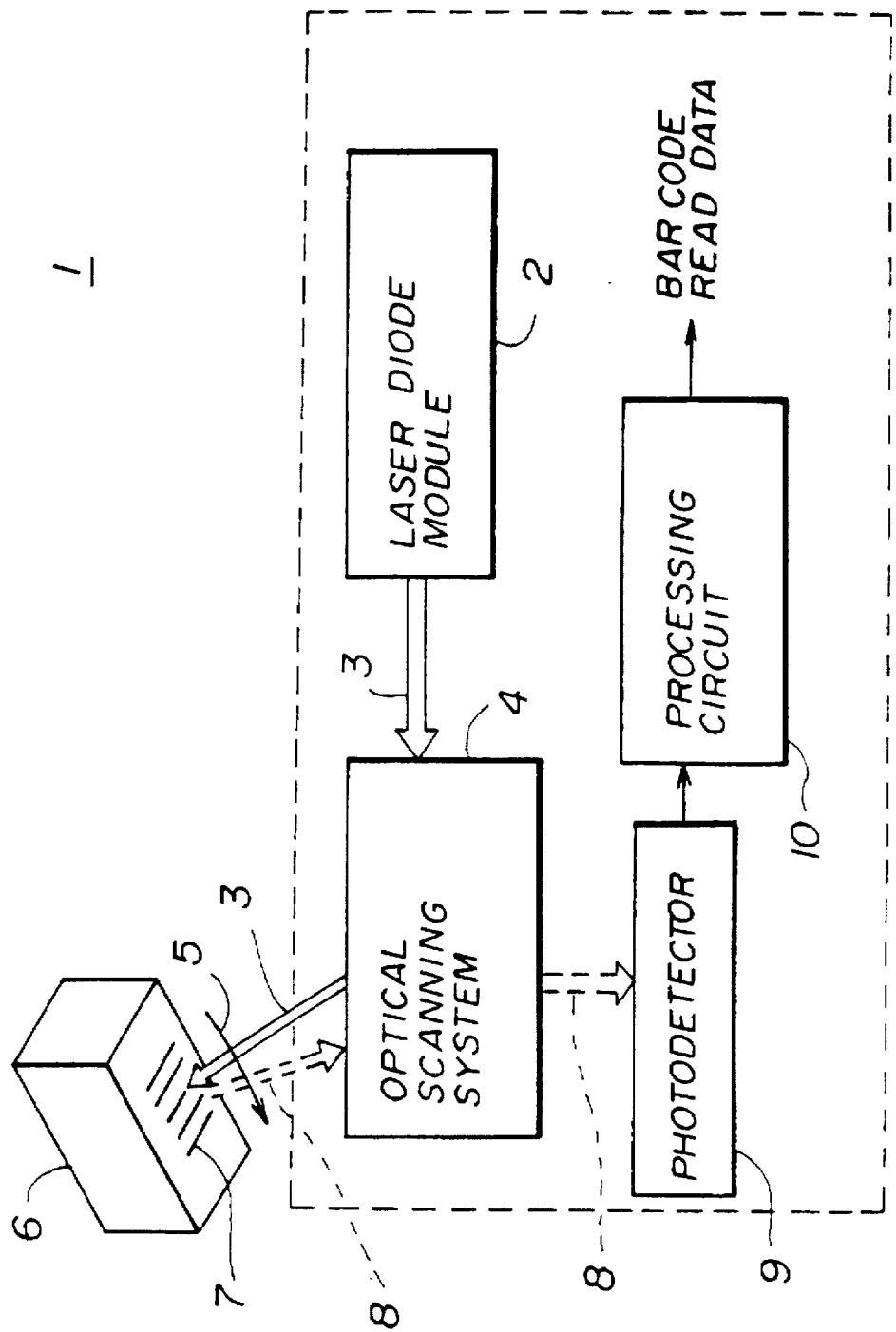
FIG. 1 is a block diagram of a bar code reader.

Referring to FIG. 1, a bar code reader 1 is made up of a laser diode module 2 functioning as a light source, an optical scanning system 4, a photodetector 9 and a processing circuit 10. A laser beam 3 emitted from the laser diode module 2 is oriented toward an item 6 and deflected as indicated by an arrow 5 by means of the optical scanning system 4, which comprises, for example, a polygon mirror and other mirrors. A bar code 7, formed on the item 6, is scanned by the deflected laser beam 3. The deflected laser beam 3 is reflected by the bar code 7 and the intensity thereof is modulated (amplitude modulation). A reflected light 8 is then detected by the photodetector 9, which outputs a corresponding electric signal to the processing circuit 10. This circuit 10 performs a predetermined operation on the received electric signal, and generates bar-code read data.

Figure 2:
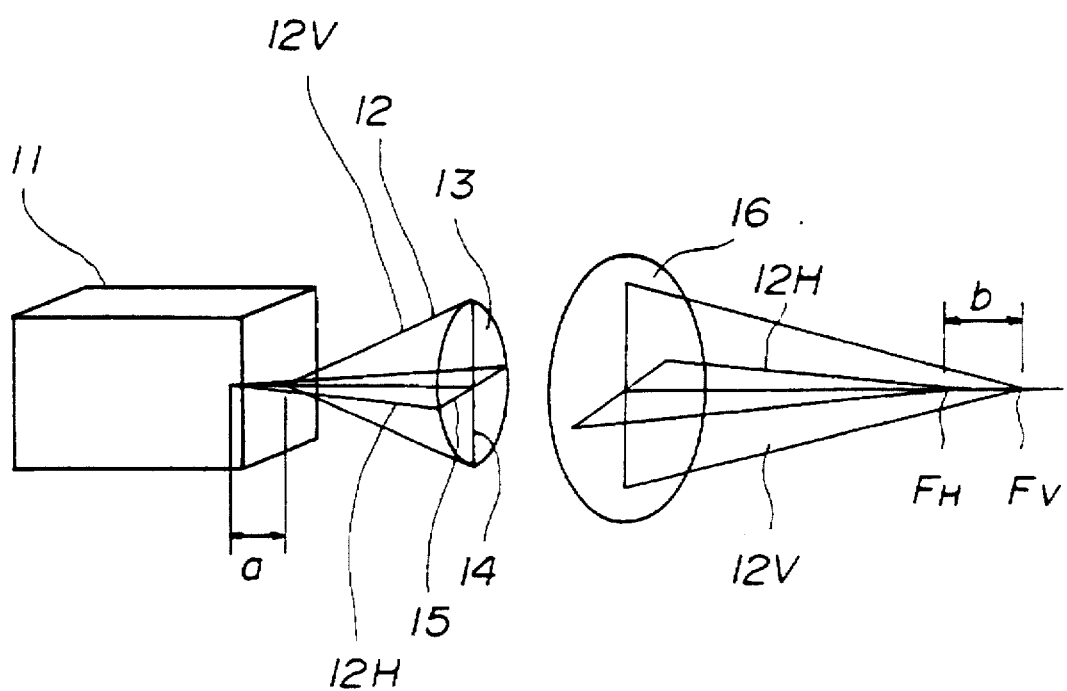
FIG. 2 is a diagram illustrating an astigmatic distance of a laser diode and a positional deviation of the focal point due to such an astigmatic distance.

The laser diode module 2 includes a laser diode and an optical element. FIG. 2 shows an optical character of a laser diode of the laser diode module 2.

FIG. 2 shows a laser diode 11 used in the laser diode module 2. As shown in FIG. 2, the laser diode 11 has an astigmatic difference 'a' normally equal to 10 μm. In actuality, the astigmatic difference of normal laser diodes ranges from 5 μm to 15 μm. Due to the astigmatic difference, a far-field pattern 13 of a laser beam 12 emitted from the laser diode 11 is of an oval shape having a long axis 14 in the vertical direction and a short axis 15 in the horizontal direction.

When the laser beam 12 is focused by the lens 16, the focal point of a laser beam component $12_V$, in the vertical direction in a vertical plane, is defined as a vertical-direction focal point $F_V$, and the focal point of a laser beam component $12_H$, in the horizontal direction in a horizontal plane, is defined as a horizontal-direction focal point $F_H$. When the aforementioned astigmatic difference ranges within ±5 μm, a distance 'b' between the vertical-direction focal point $F_V$ and the horizontal-direction focal point $F_H$ ranges within ± a few tens of microns.

When different laser diodes have different distances 'b', different bar code readers have different read performances. With the above in mind, conventional laser diode modules are equipped with an adjustment mechanism designed to make the difference 'b' constant. Further, it is required to provide compact laser diode modules.

Figure 3:
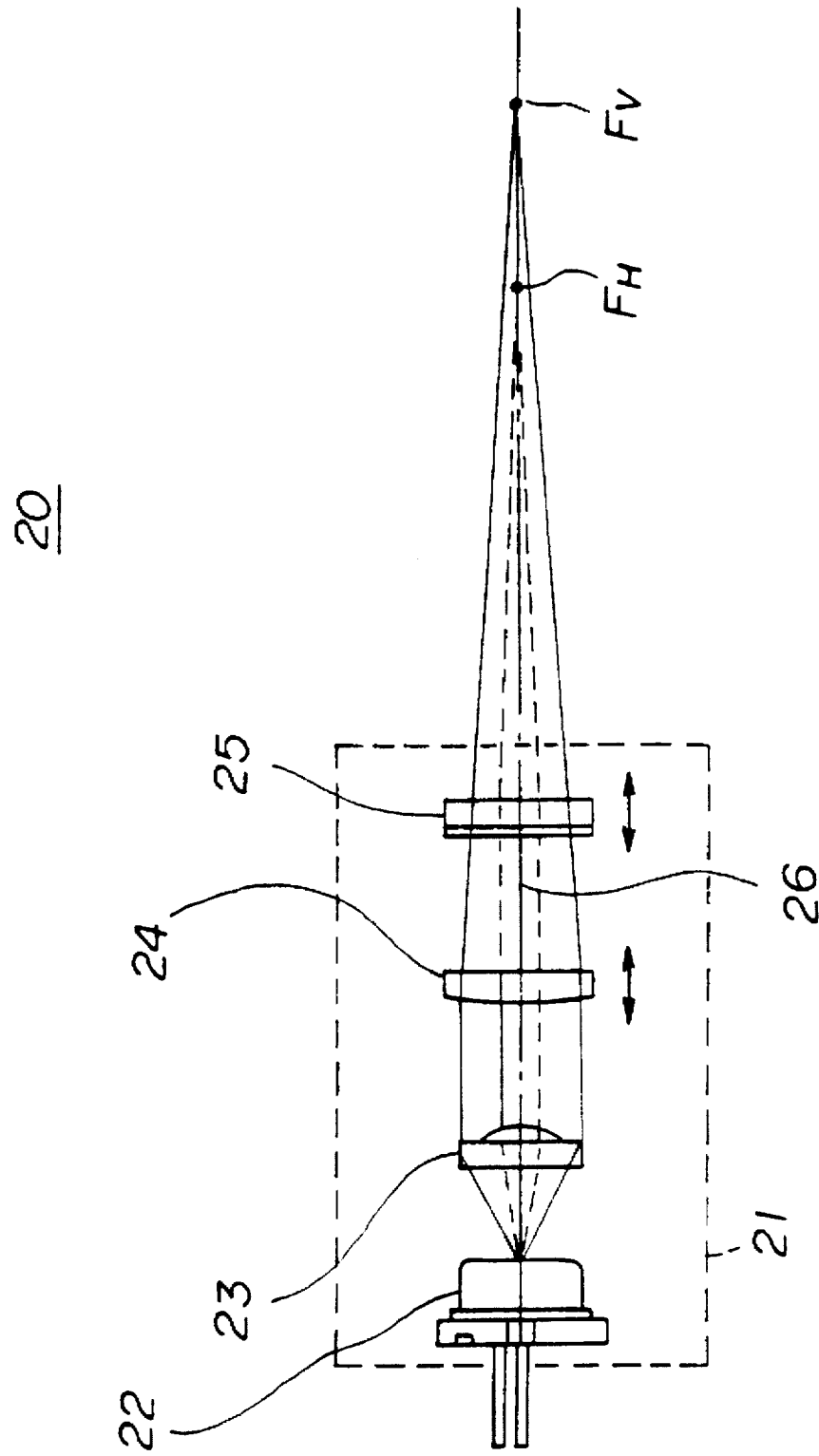
FIG. 3 is a diagram of a conventional laser diode module.

FIG. 3 shows a conventional laser diode module 20 made up of a laser diode 22, a collimating lens 23, a cylindrical lens 24 and a cylindrical lens 25, these elements being arranged on an optical axis 26. The cylindrical lens 24 functions to converge the laser beam emitted from the laser diode 22 in the vertical direction. The cylindrical lens 25 functions to converge the laser beam in the horizontal direction. The lenses 24 and 25 are provided so that the positions thereof are independently adjusted along the optical axis 26. The position of the horizontal-direction focal point $F_H$ can be adjusted by adjusting the position of the lens 25 along the optical axis 26. The position of the vertical-direction focal point $F_V$ can be adjusted by adjusting the position of the lens 24 along the optical axis 26.

However, the conventional laser diode shown in FIG. 3 has a disadvantage in that the module 20 is of a large size and is expensive due to use of the three lenses 23, 24 and 25.

It is to be noted that the present invention is based on a phenomenon found by the inventors. A description will now be given, with reference to FIGS. 4 and 5, of such a phenomenon.

Figure 4:
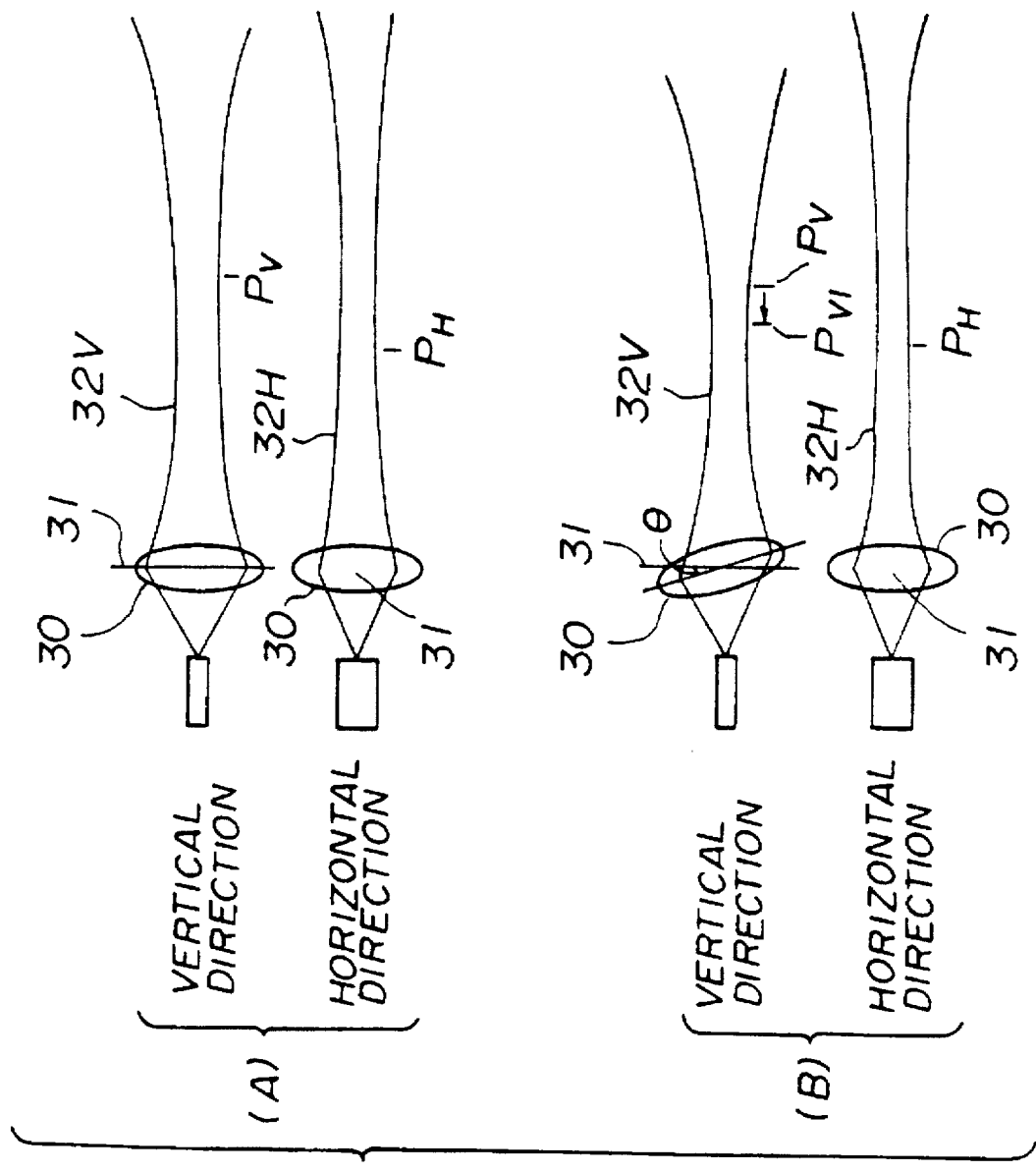
FIG. 4 is a diagram explaining a phenomenon found by the inventors.

As shown in FIG. 4-(A) and FIG. 4-(B), the inventors attempted to tilt a lens 30 with respect to a horizontal axis 31. At this time, the inventors observed that the position $P_H$ of a beam waist of a beam $32_H$ in the horizontal direction did not change, while the position $P_V$ of a beam waist of a beam $32_V$ in the vertical direction changed from an original position $P_V$ to a position $P_{V1}$ towards the lens 30.

Figure 5:
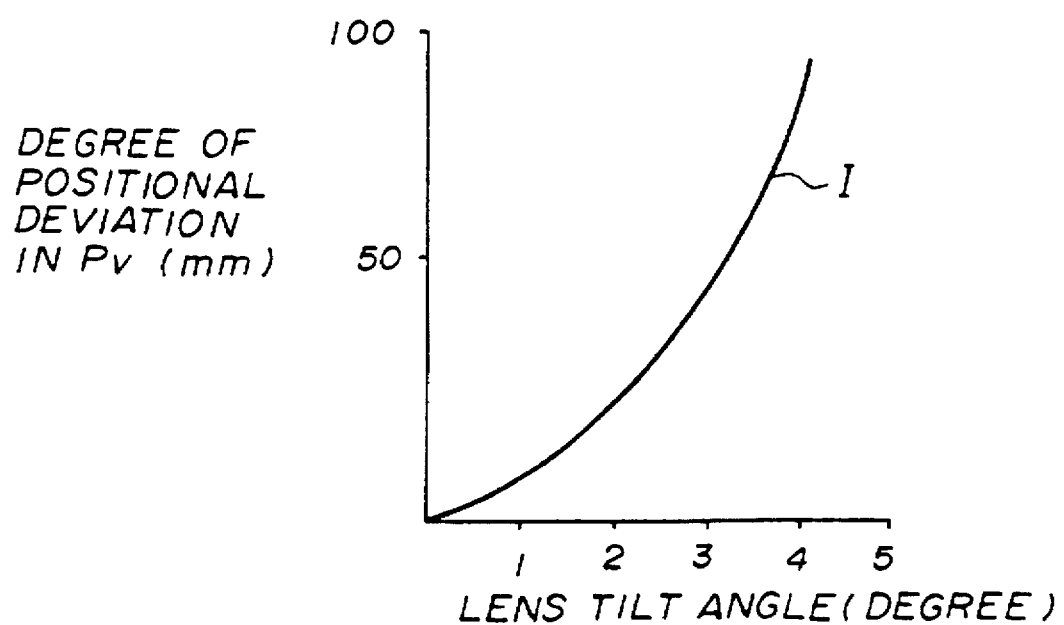
FIG. 5 is a graph of a relationship between a deviation of the position of a beam waist and a lens tilting angle.

The inventors also found that a tilt angle θ of the lens 30 and the degree of positional variation in the beam waist from the original position $P_V$ have a relationship indicated by a line I in FIG. 5. It can be seen from FIG. 5 that the degree of positional variation in the beam waist position $P_V$ is increased as the tilt angle θ is increased, within a certain range.

A description will now be given of embodiments of the present invention. It will be noted that the present invention has a mechanism for tilting a lens.

Figure 6A:
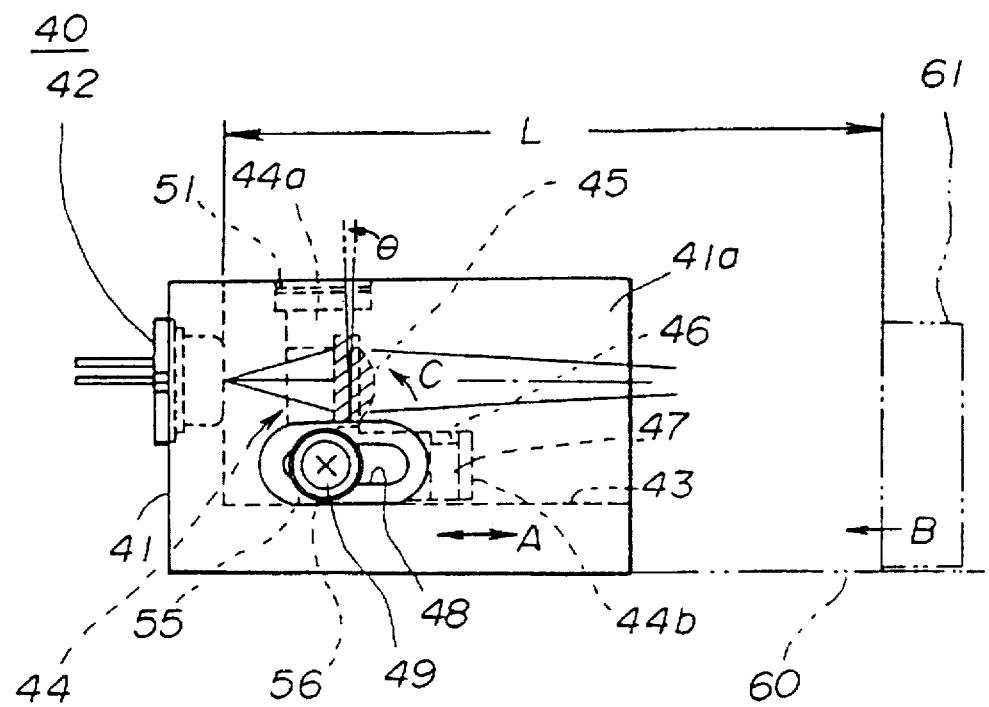
FIG. 6A is a front view of a laser diode module according to a first embodiment of the present invention.
Figure 6B:
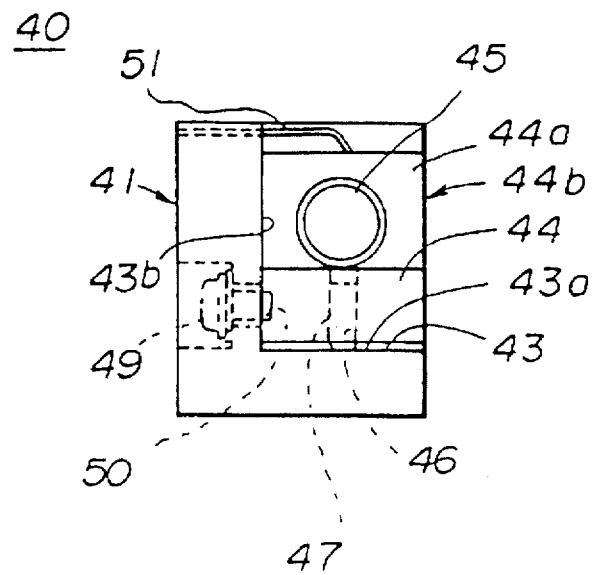
FIG. 6B is a side view of the laser diode module shown in FIG. 6A.
Figure 6C:
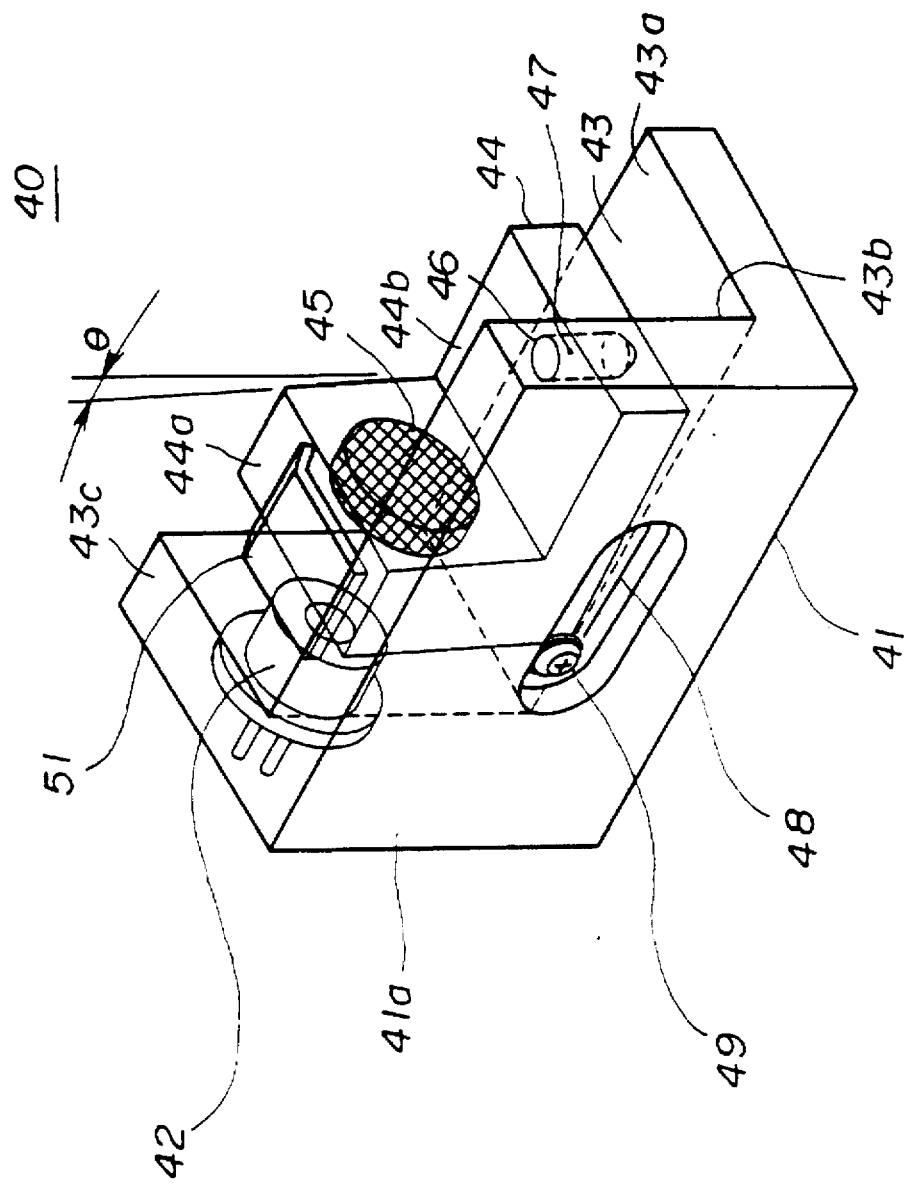
FIG. 6C is a perspective view of the laser diode module shown in FIGS. 6A and 6B.

FIGS. 6A, 6B and 6C are diagrams of a laser diode module 40 according to a first embodiment of the present invention. The laser diode module 40 includes a base 41 having a first vertical portion 43c to which a laser diode 42 is fixed. Further, the base 41 has a lens holder mounting part 43, which includes a horizontal lens holder mounting portion 43a and a second vertical portion 43b. The surfaces of the portions 43a and 43b are high-precision flat surfaces.

A lens holder 44 is of a substantially L-shape, and has a vertical portion 44a and a horizontal portion 44b. A lens 45 is fixed to the vertical portion 44a. A through female screw 46 is vertically formed at an end part of the horizontal portion 44b of the lens holder 44. An adjustment male screw 47 for pivoting the lens holder 44 engages the female screw 46. An end portion of the adjustment male screw 47 can project from the lower surface of the horizontal portion 44b of the lens holder 44.

A hole 48 that is long (i.e., elongated) the horizontal direction is formed in a vertical wall 41a of the base 41. A male screw 49 is inserted into the long hole 48 and is engaged with a female screw 50 formed in a root portion at which the vertical portion 44a of the lens holder 44 and the horizontal portion 44b thereof are connected to each other.

A leaf spring 51 presses the lens holder 44 against the lens holder mounting portion 43a of the base 41.

An adjustment operation of the lens holder 44 is performed as follows. As shown in FIG. 6A, an optical bench 60 and a beam spot measuring instrument 61 are used to perform the adjustment operation. At the first step of the adjustment operation, the base 41 and the measuring instrument 61 are placed on the optical bench 60 so that the distance between the laser diode 42 and the measuring instrument 61 is equal to a predetermined distance L.

At the second step of the adjustment operation, the horizontal-direction focal point is adjusted as follows. The male screw 49 is turned (loosed) in a state in which the screw 47 does not project from the lower surface of the horizontal portion 44b of the lens holder 44. In other words, the male screw 49 is turned in a state in which the lens 45 is not tilt. An output signal of the measuring instrument 61 is monitored while the lens holder 44 is made to slide on the lens holder mounting portion 43a in a direction indicated by a two-headed arrow A, as shown in FIG. 6A. In this manner, the position of the lens holder 44, at which a minimum beam spot size can be obtained, is identified. Therefore, the screw 49 is secured so that the lens holder 44 is provisionally fixed to the base 41.

At the third step of the adjustment operation, the vertical-direction focal point is adjusted as follows. The measuring instrument 61 is moved in a direction indicated by a single-headed arrow B, as shown in FIG. 6A. Thereafter, the screw 47 is turned so that it projects downwardly from the horizontal portion 44b of the lens holder 44. Hence, the screw 47 presses downwardly on the lens holder mounting portion 43a, so that the lens holder 44 is turned (i.e., rotated) as indicated by an arrow C shown in FIG. 6A. Hence, an angle θ between the vertical direction and the vertical surface of the vertical portion 44a of the lens holder 44 is formed. That is, the lens 45 is tilted by the angle θ in the counterclockwise direction. It will be noted that the lens 45 is tilted by tilting the lens holder 44 in the above-mentioned manner and hence no stress is exerted on the lens 45. The screw 47 is turned in order to determine a tilted position of the lens holder 44 at which a minimum beam spot size can be obtained. Then, the screw 49 is secured to fix the lens holder 44 to the base 41. When the third step of the adjustment operation is completed, the adjustment operation is completed.

Figure 7A:
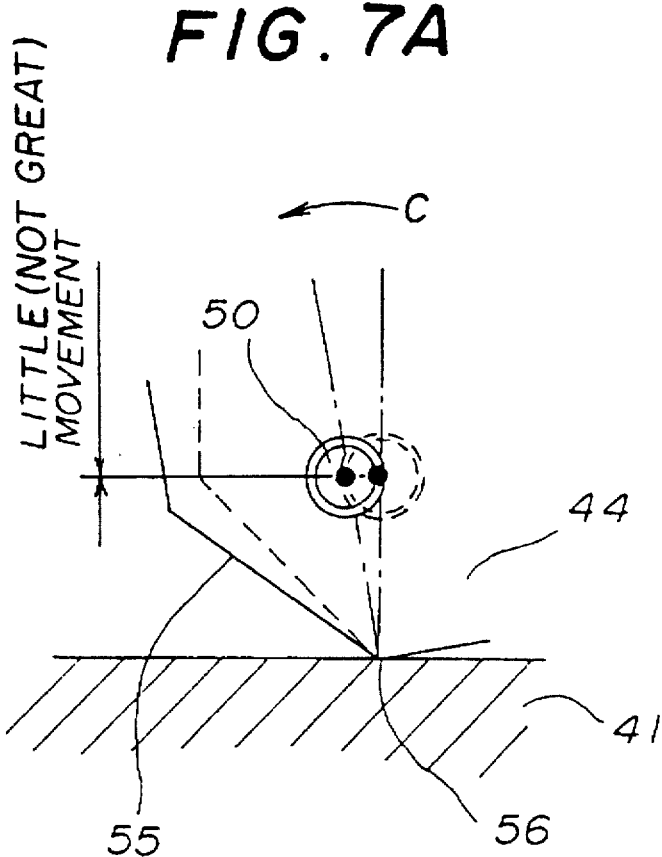
FIGS. 7A and 7B are diagrams illustrating variations in the position of a screw hole formed in a lens holder used in the first embodiment of the present invention.
Figure 7B:
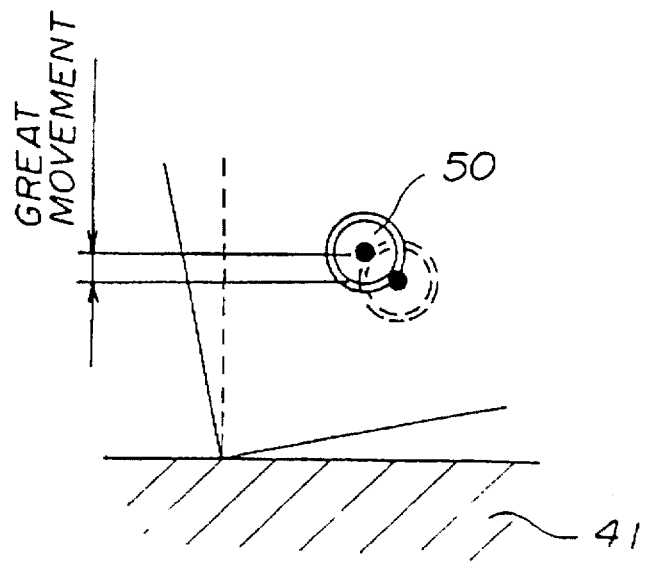

As shown in FIG. 7A, the lens holder 44 has a chamfered corner 55. At the third step of the adjustment operation, the lens holder 44 is caused to pivot about an end 56 of the chamfered corner 55 in the direction indicated by the arrow C. The chamfered corner 55 is formed so that the end 56 is located just below the female screw 50. If the chamfered portion 55 is not formed, as shown in FIG. 7B, the position of the female screw 50 will move greatly in the vertical direction, and the possible tilt angle θ will be limited to a narrow range due to the relation with the long hole 48. On the other hand, the chamfered corner 55 causes the female screw 50 to be moved, as shown in FIG. 7A. It will be seen from FIG. 7A that the position of the female screw 50 does not move greatly in the vertical direction. With the above structure, it is possible to cause the lens holder 44 to pivot about the end 56 up to approximately 10° and to facilitate the adjustment of the vertical-direction focal point.

The leaf spring 51 presses the lens holder 44 against the lens holder mounting surface 43a. Hence, the lens holder 44 can be made to pivot about the end 56 in the state where the end 56 is in contact with the lens holder mounting surface 43a of the base 41.

Figure 8:
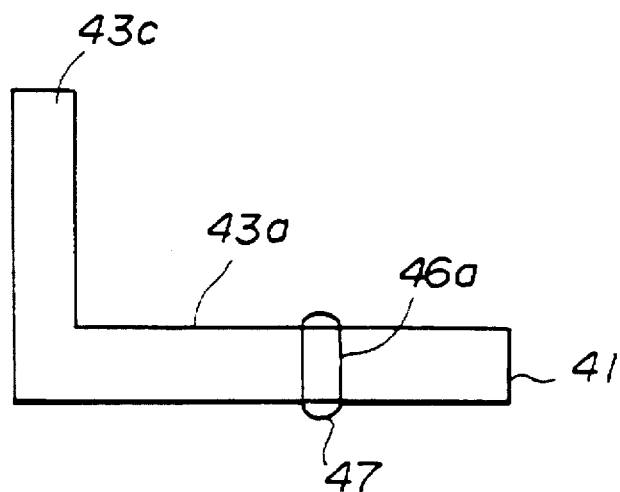
FIG. 8 is a front view of a variation of a base used in the first embodiment of the present invention.

Alternatively, as shown in FIG. 8, it is possible to provide the adjustment screw 47 so that it engages a female screw 46a formed in the base 41 and can project upwardly from the lens holder mounting surface 43a of the base 41.

Figure 9:
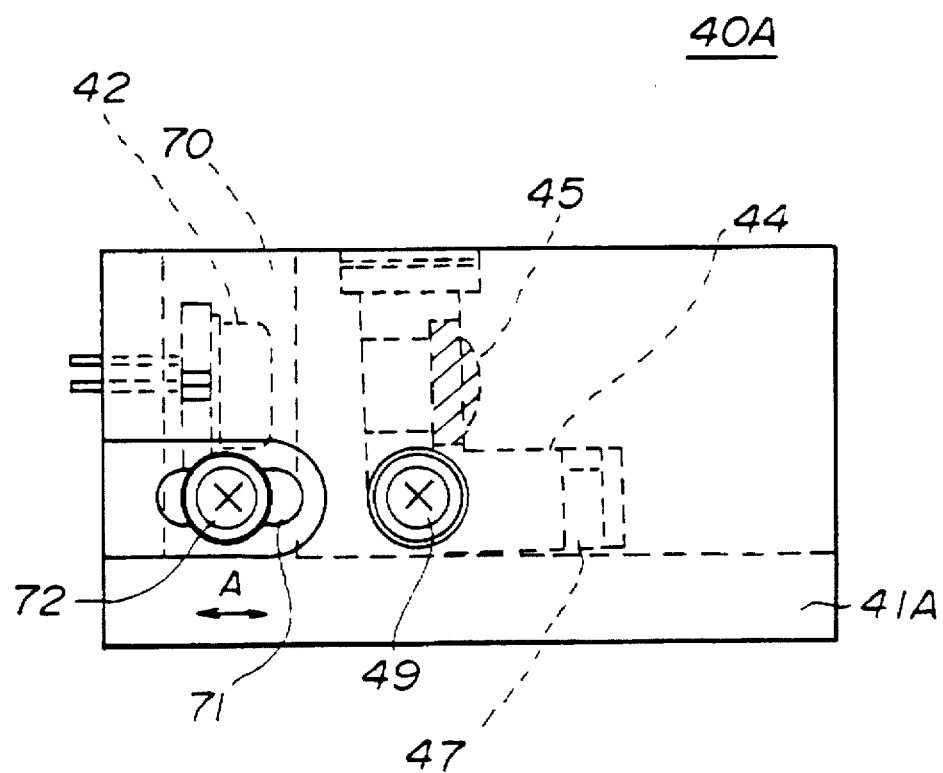
FIG. 9 is a front view of a laser diode module according to a second embodiment of the present invention.
Figure 10:
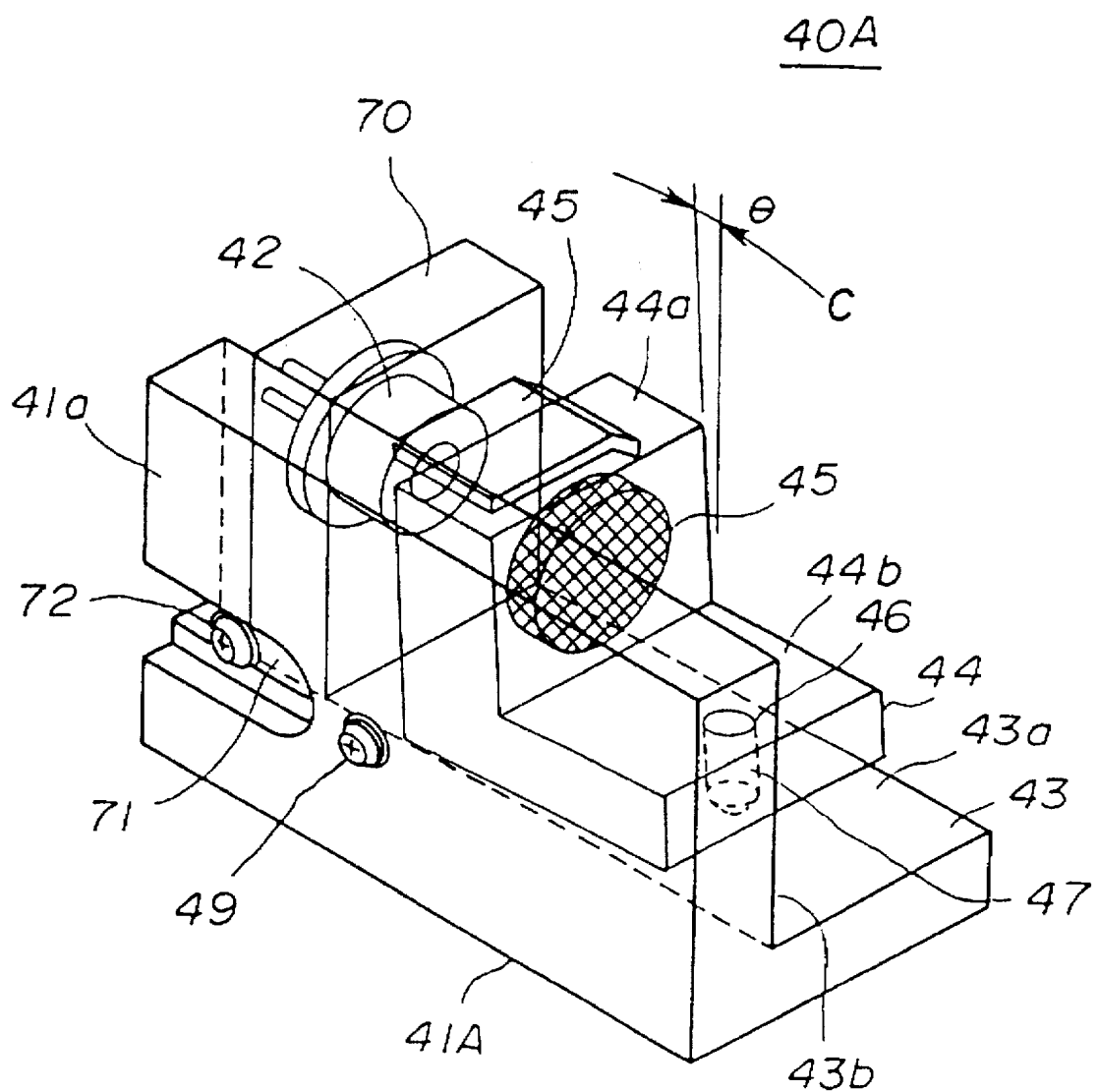
FIG. 10 is a perspective view of the laser diode module shown in FIG. 9.

A description will now be given, with reference to FIGS. 9 and 10, of a laser diode module 40A according to a second embodiment of the present invention. In FIGS. 9 and 10, parts that are the same as those shown in the previously described figures are given the same reference numbers.

The laser diode module 40A shown in FIGS. 9 and 10 has a base 41A having a hole 71 which is formed in the vertical portion 41a of the base 41A and is long (i.e., elongated) in the horizontal direction A. The lens holder 44 is rotatable in the direction indicated by the arrow C (FIG. 10). A laser diode holder 70 is provided so that it can slide on the lens holder mounting surface 43a in the direction A (FIG. 9). It will be noted that the base 41A shown in FIGS. 9 and 10 does not have the vertical portion 43c of the base 41 shown in FIGS. 6A through 6C. The laser diode holder 70 can be fixed at a desired position by means of a male screw 72, which is inserted into the long hole 71 and is engaged with a female screw formed in the laser diode holder 70.

The horizontal-direction focal point can be adjusted so that the lens holder 70 is moved in the direction A. The vertical-direction focal point can be adjusted by means of the screw 47 in the same manner as that in the first embodiment of the present invention.

Figure 11A:
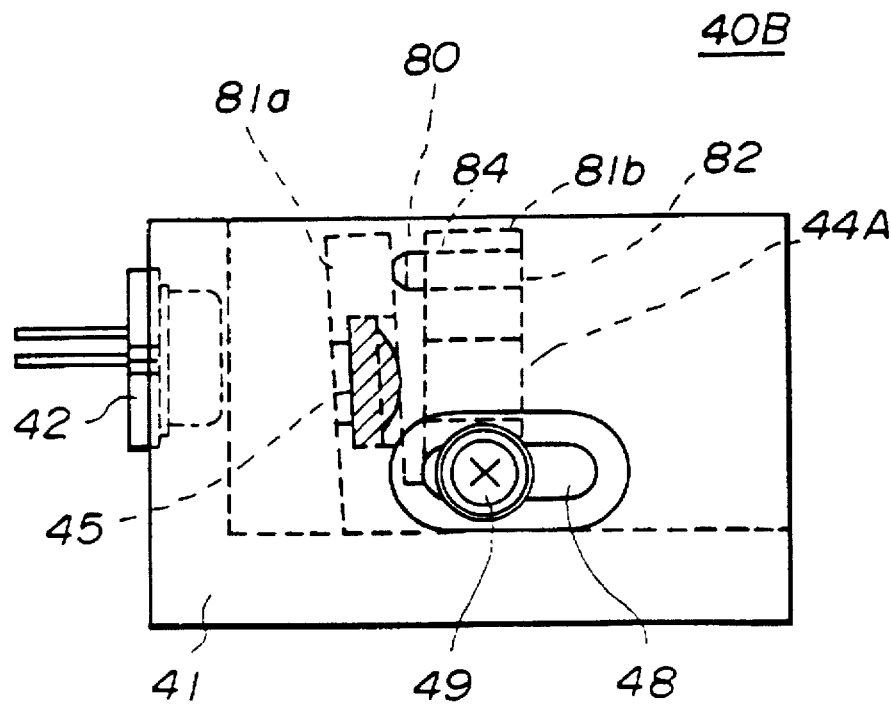
FIG. 11A is a front view of a laser diode module according to a third embodiment of the present invention.
Figure 11B:
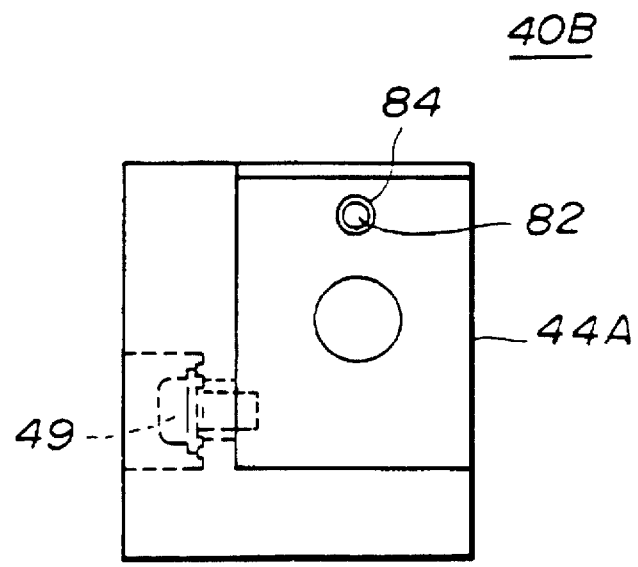
FIG. 11B is a side view of the laser diode module shown in FIG. 11A.

A description will now be given, with reference to FIGS. 11A, 11B and 11C, of a laser diode module 40B according to a third embodiment of the present invention. In FIGS. 11A through 11C, parts that are the same as those shown in the previously described figures are given the same reference numbers.

A lens holder 44A, to be used instead of the aforementioned lens holder 44, has a first vertical plate portion 81a and a second vertical portion 81b. The lens holder 44A is an integrally formed member and the portions 81a and 81b thereof are integrally formed and are opposite to each other via a slit 80. The lens 45 is fixed to the first vertical plate portion 81a. The second vertical portion 81b has a through hole 80b extending in the horizontal direction and allows the laser beam, via the lens 45, to pass through the through hole 80b. A through female screw 84 is formed in the vertical portion 81b and is located above the through hole 80b. A male screw 82, which engages the female screw 84, passes through the slit 80 and can come in contact with an upper portion of the vertical plate portion 81a. By turning the male screw 82, it gradually presses the vertical plate portion 81a, which is gradually bent and tilted, so that the lens 45 is tilted by the angle θ. The slit 80 makes the vertical plate portion 81a flexible. In this manner, the vertical-direction focal point can be adjusted.

The horizontal-direction focal point can be adjusted in the same manner as that of the first embodiment of the present invention. That is, the lens holder 44A is slidable on the lens holder mounting surface 43a, and is fixed at a position where a minimum beam spot size can be obtained.

Figure 12:
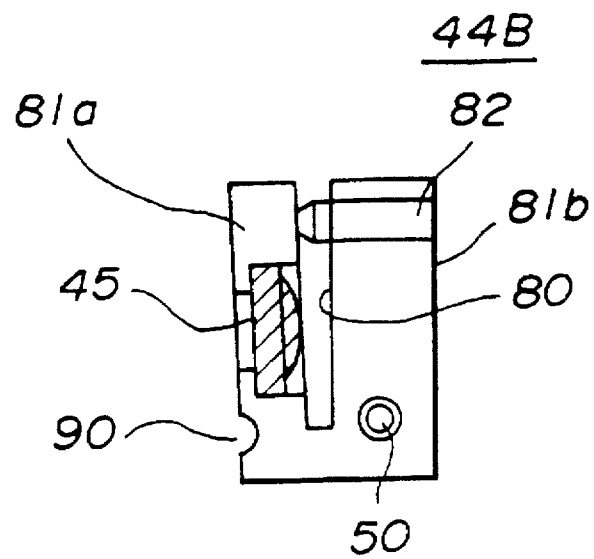
FIG. 12 is a side view of a first variation of a lens holder shown in FIGS. 11A through 11C.

FIG. 12 is a diagram of a first variation 44B of the lens holder 44A used in the third embodiment of the present invention. In FIG. 12, parts that are the same as those shown in the previously described figures are given the same reference numbers. A groove 90 is formed in an outer root portion of the vertical plate portion 81a. The groove 90 facilitate the degree of flexibility of the vertical plate portion 81a.

Figure 13:
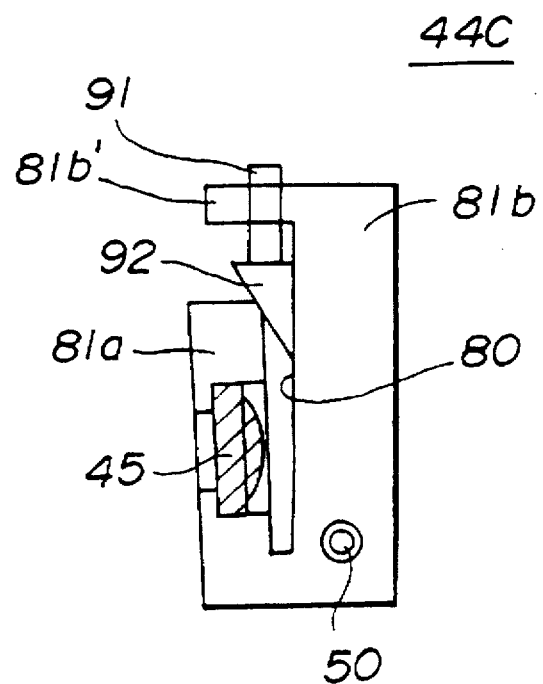
FIG. 13 is a side view of a second variation of the lens holder shown in FIGS. 11A through 11C.

FIG. 13 is a diagram of a second variation 44C of the lens holder 44A used in the third embodiment of the present invention. In FIG. 13, parts that are the same as those shown in the previously described figures are given the same reference numbers. The vertical portion 81b has a horizontal projection 81b' located above the slit 80. A male screw 91 vertically penetrates the horizontal portion 81b' and projects therefrom. A female screw engaging the male screw 91 is formed in the horizontal projection 81b'. A wedge 92 is depressed by the male screw 91, so that the wedge 92 is forced to be inserted into the slit 80. The adjustment operation can be performed from the upper side of the laser diode module without interrupting the laser beam emitted via the lens 45.

Figure 14:
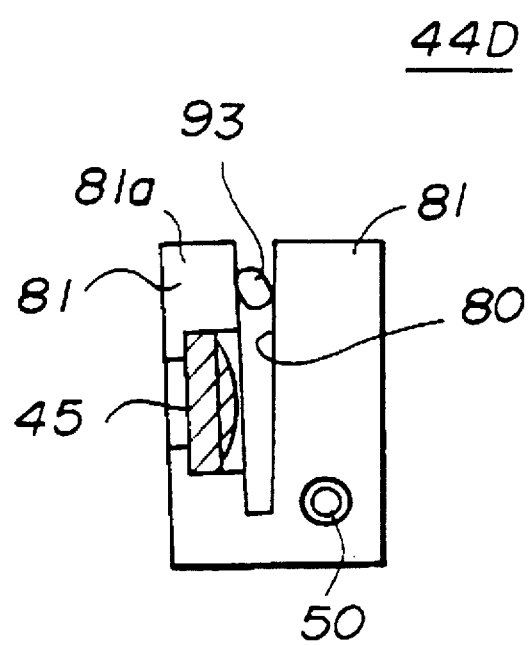
FIG. 14 is a side view of a third variation of the lens holder shown in FIGS. 11A through 11C.

FIG. 14 is a diagram of a third variation 44D of the lens holder 44A used in the third embodiment of the present invention. In FIG. 14, parts that are the same as those shown in the previously described figures are given the same reference numbers. A rod 93 having an oval cross-section is rotatably provided in the slit 80. By rotating the rod 93, the vertical plate portion 81a is bent, so that the lens 45 is tilted.

Figure 15A:
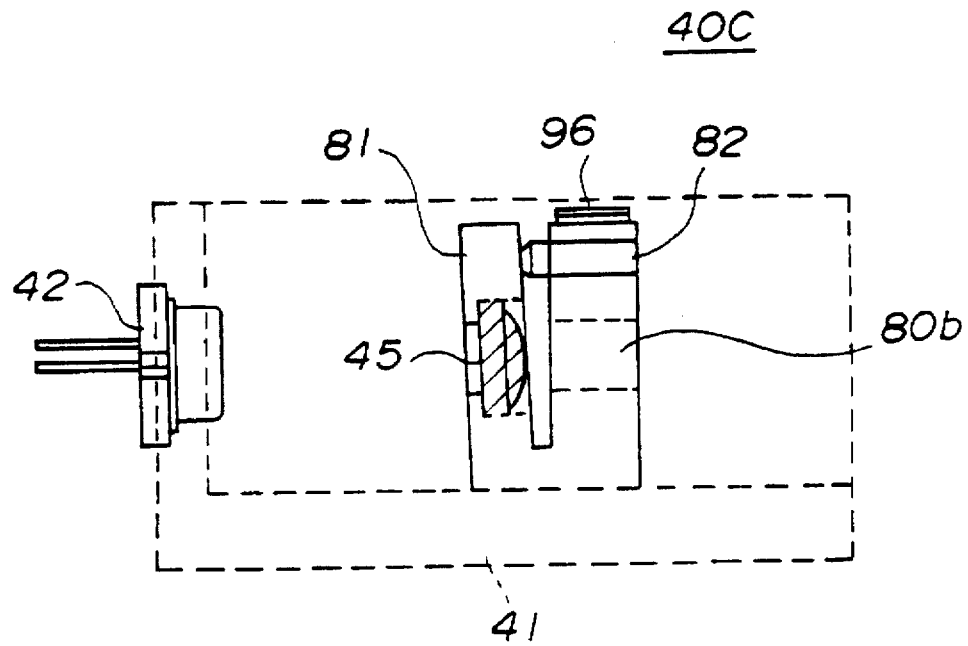
FIG. 15A is a front view of a laser diode module according to a fourth embodiment of the present invention.
Figure 15B:
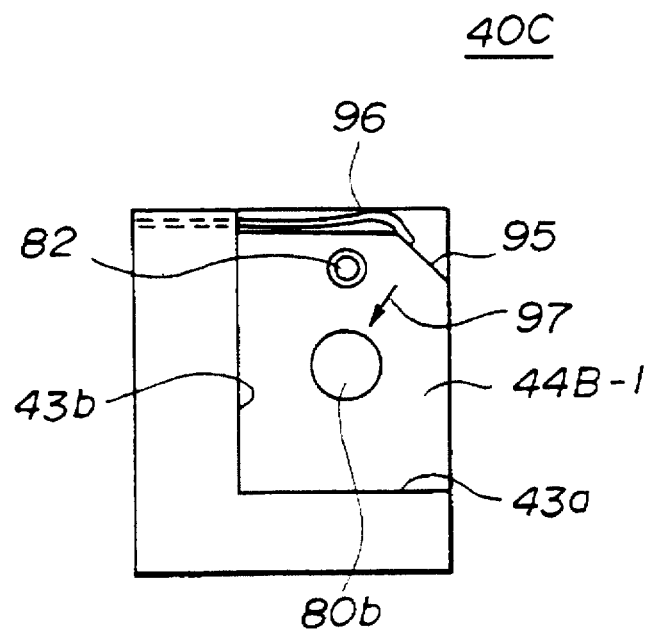
FIG. 15B is a side view of the laser diode module shown in FIG. 15A.
Figure 15C:
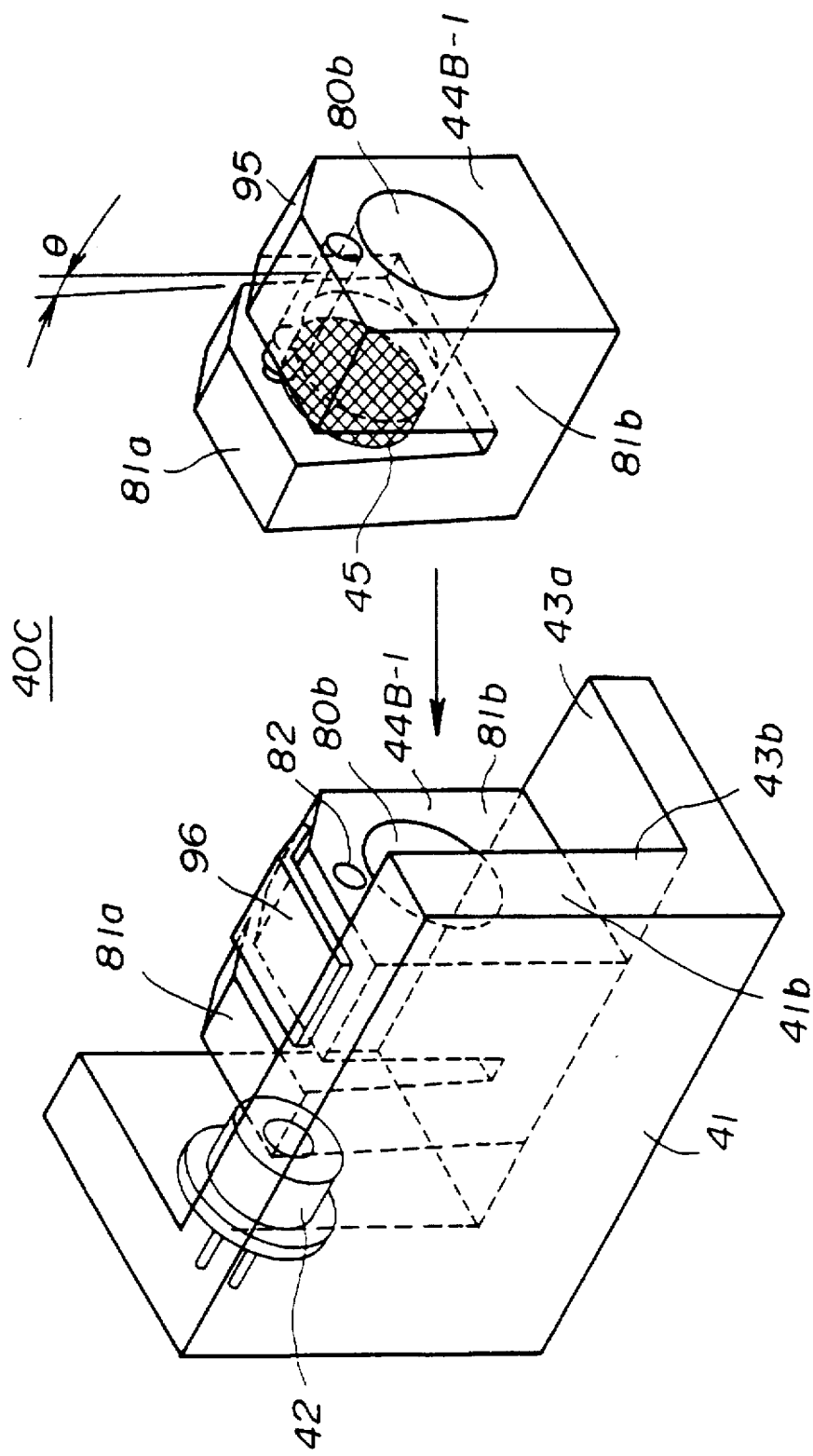
FIG. 15C is a perspective view of the laser diode module shown in FIGS. 15A and 15B.

A description will now be given, with reference to FIGS. 15A, 15B and 15C, of a laser diode module 40C according to a fourth embodiment of the present invention. In FIGS. 15A through 15C, parts that are the same as those shown in the previously described figures are given the same reference numbers.

A lens holder 44B-1 includes the vertical projections 81a and 81b. A sloped portion 95 is formed on a corner of the vertical portion 81b. A leaf spring 96 having an end embedded in the vertical portion 41b of the base 41 engages the sloped portion 95 of the vertical portion 81b. The leaf spring 96 urges the lens holder 44B-1 in a direction indicated by an arrow 97 shown in FIG. 15B. Hence, the lens holder 44B-1 is pressed against the lens holder mounting surface 43a and the vertical surface 43b. After the positioning of the lens holder 44B-1 is completed, the lens holder 44B-1 can be fastened to the base 41 by means of an adhesive or the like.

Figure 16A:
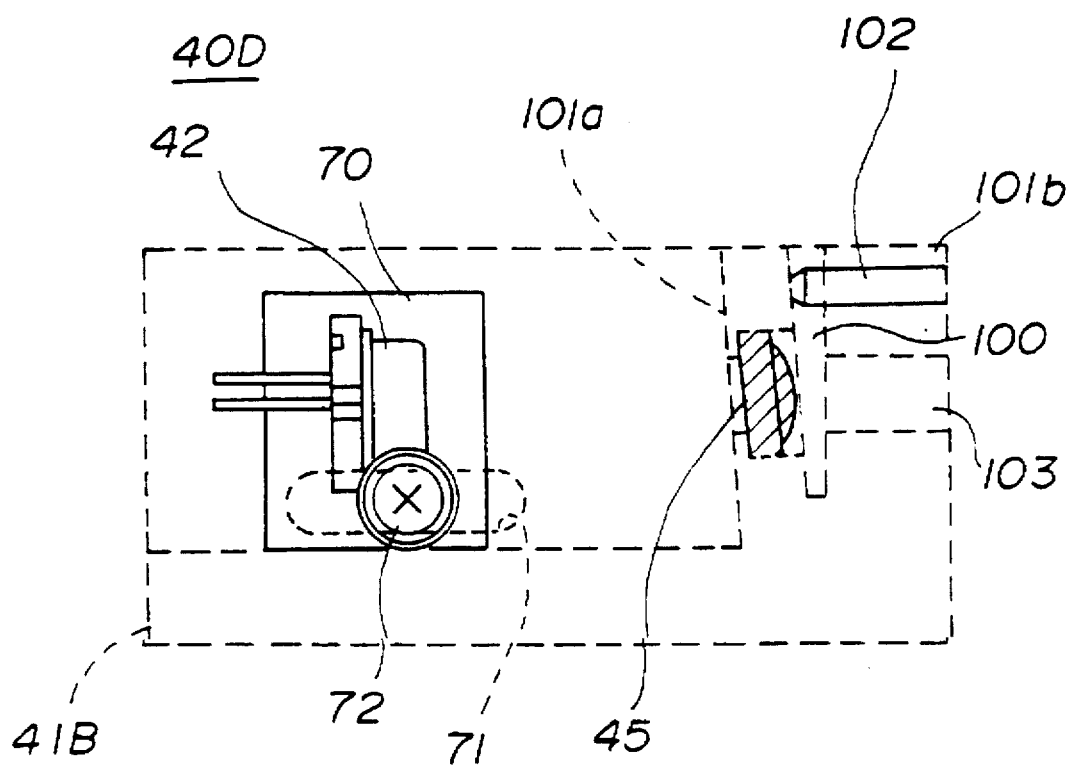
FIG. 16A is a front view of a laser diode module according to a fifth embodiment of the present invention.
Figure 16B:
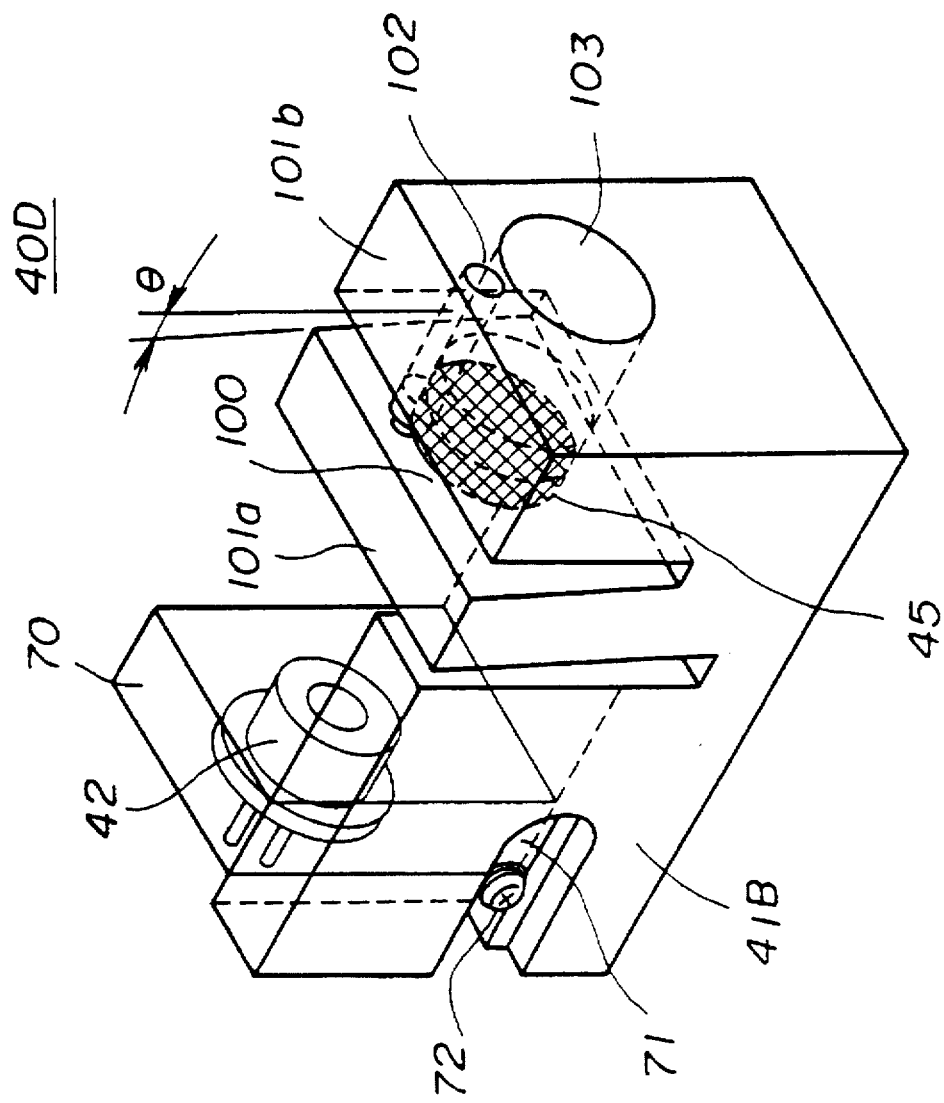
FIG. 16B is a perspective view of the laser diode module shown in FIG. 16A.

FIGS. 16A and 16B are diagrams of a laser diode module 40D according to a fifth embodiment of the present invention. In FIGS. 16A and 16B, parts that are the same as those shown in the previously described figures are given the same reference numbers. A base 41B has a first vertical plate portion 101a and a second vertical portion 101b, these portions being spaced apart from each other via a slit 100. The lens 45 is fixed to the vertical portion 101a. A male screw 102 engages a female screw formed in the vertical portion 101b and projects therefrom. A through hole 103 is formed in the vertical portion 101b so that the laser beam passing through the lens 45 is allowed to pass. The screw 102 comes into contact with an upper portion of the vertical portion 101a. By turning the screw 102, the vertical portion 101a is bent and tilted, so that the lens 45 can be tilted. The laser diode 42 is held by the laser diode holder 70, also used in the second embodiment of the present invention. Since the screw 102 for the adjustment is provided in the base 41B fixed to the optical bench, it is easy to operate the screw 102.

Figure 17A:
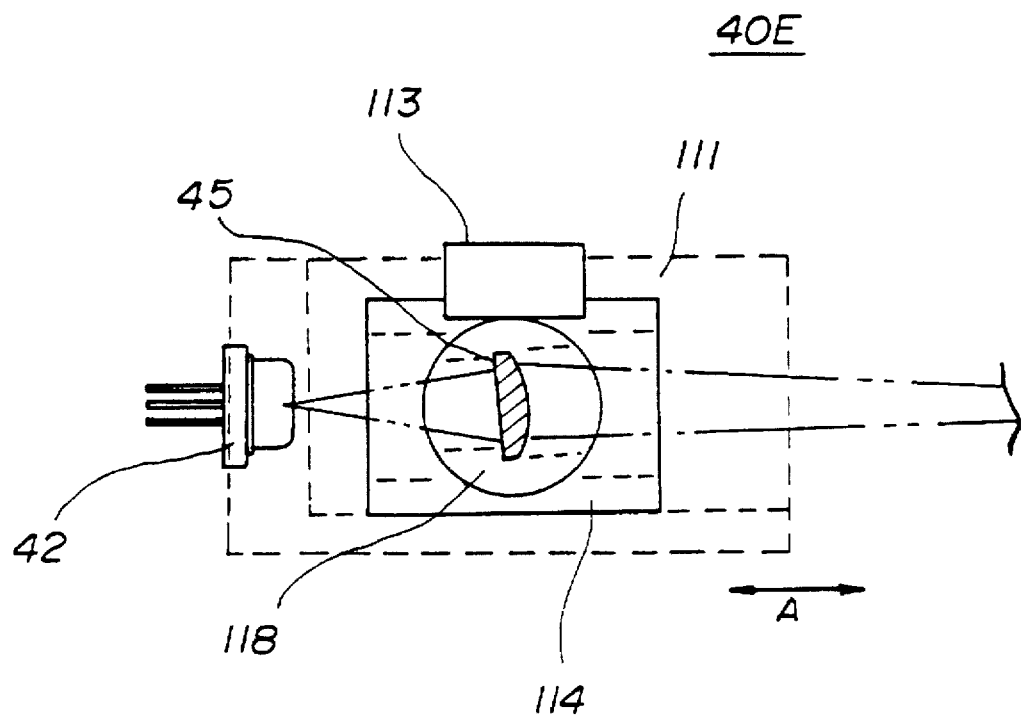
FIG. 17A is a front view of a laser diode module according to a sixth embodiment of the present invention.
Figure 17B:
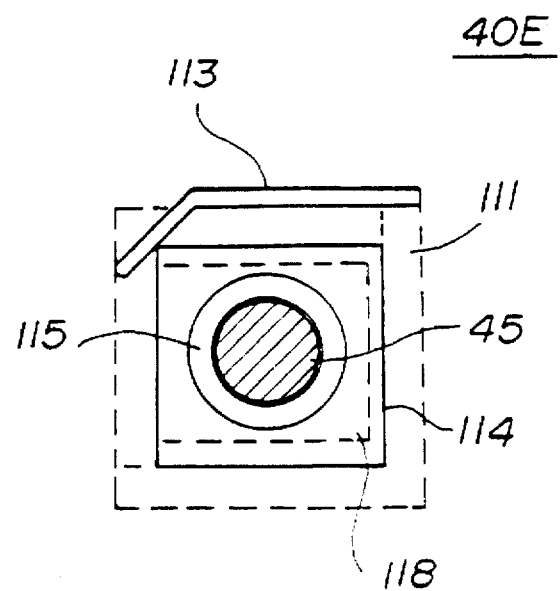
FIG. 17B is a side view of the laser diode module shown in FIG. 17A.
Figure 17C:
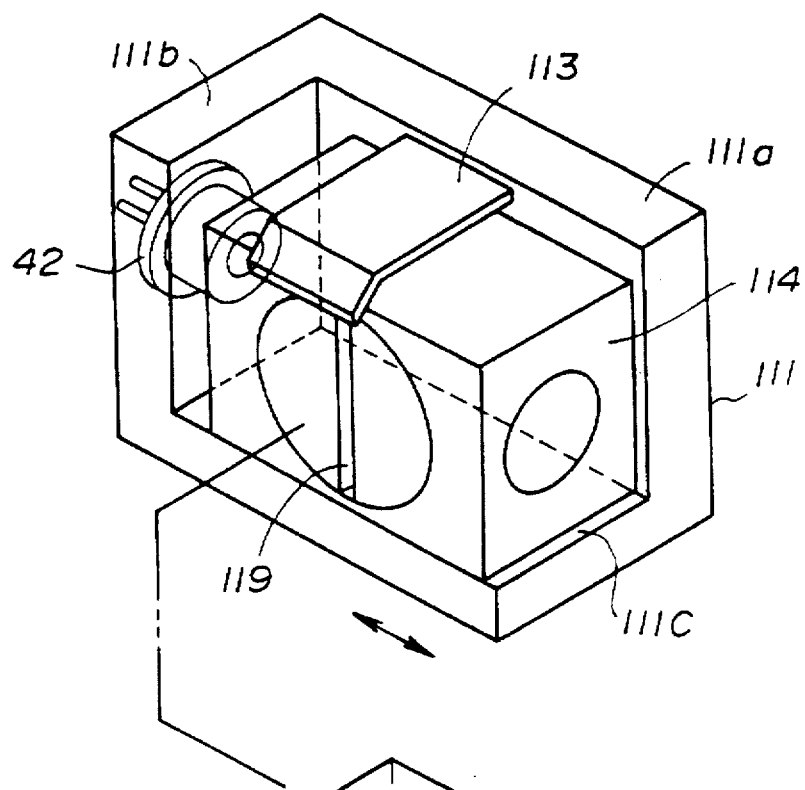
FIG. 17C is a perspective view of the laser diode module shown in FIGS. 17A and 17B.
Figure 17C:
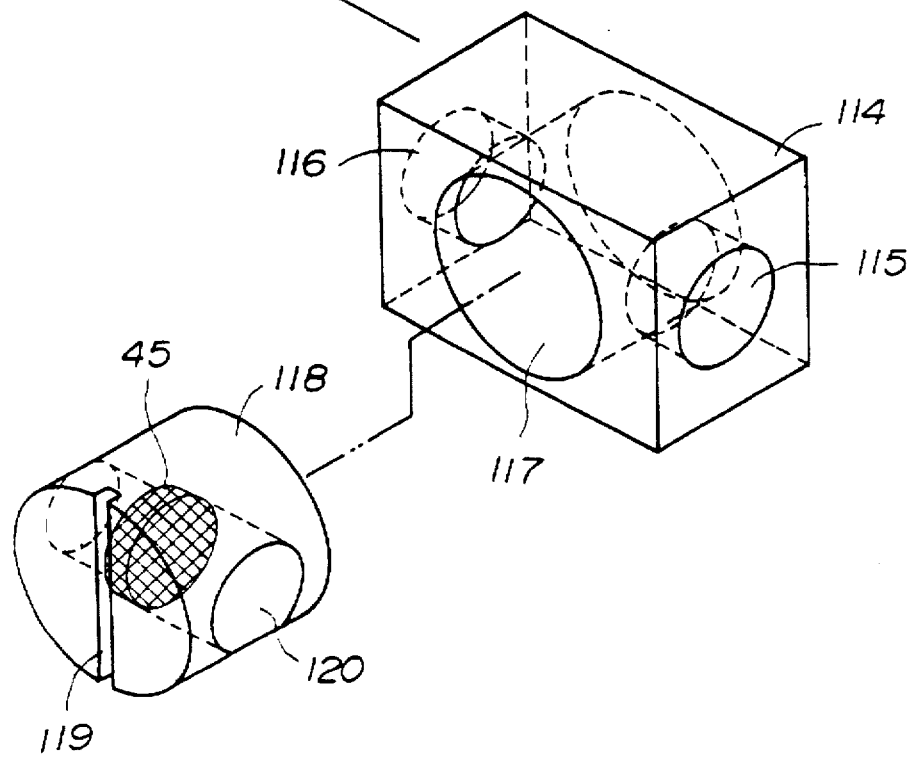

A description will now be given, with reference to FIG. 17A, 17B and 17C, of a laser diode module 40E according to a sixth embodiment of the present invention. The laser diode module 40E includes a base 111 having a first vertical portion 111a, a second vertical portion 111b, and a holder mounting surface 111c. The first and second vertical portions 111a and 111b are provided so that these portions form a right angle. The laser diode 42 is fixed to the second vertical portion 111b.

A holder 114 is mounted on the holder mounting surface 111c, and is slidable thereon. A leaf spring 113 fixes the holder 114 on the holder mounting surface 111C in a state in which the holder 114 is in contact with the first vertical portion 111a of the base 111. One end of the leaf, spring 113 is embedded in the first vertical portion 111a, and the other end engages an edge of the holder 114.

The holder 114 has a large cylindrical through hole 117, and two small cylindrical holes 115 and 116. The holes 115 and 116 are located on respective sides of the through hole 117 and are connected to the through hole 117. The laser beam emitted from the laser diode 42 enters into the hole 116. The through hole 117 accommodates a lens holder 118 having a cylindrical shape and almost the same diameter as that of the holder 114. The lens holder 118 has a through hole 120, which is integrated with the holes 115 and 116 when the lens holder 118 is inserted into the holder 114 and placed in position. The lens 45 is located in the through hole 120 of the lens holder 118. The laser beam from the hole 116 passes through the lens 45 and is emitted through the hole 115. A straight groove 119 is formed on a front surface of the lens holder 118. By turning the lens holder 118, when accommodated in the holder 114, by means of an instrument engaged with the groove 119, it is possible to tilt the lens 45 with respect to the laser beam emitted from the laser diode 42. Thereby, the vertical-direction focal point can be adjusted. The horizontal-direction focal point can be adjusted by moving the holder 114 in the direction A.

Figure 18A:
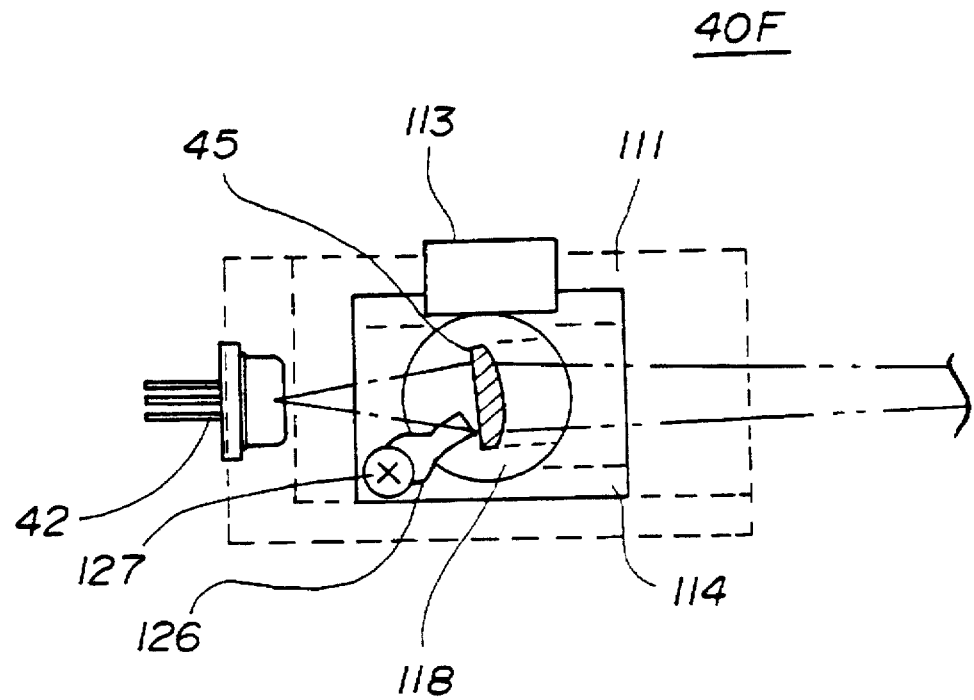
FIG. 18A is a front view of a laser diode module according to a first variation of the laser diode module shown in FIGS. 17A through 17C.
Figure 18B:
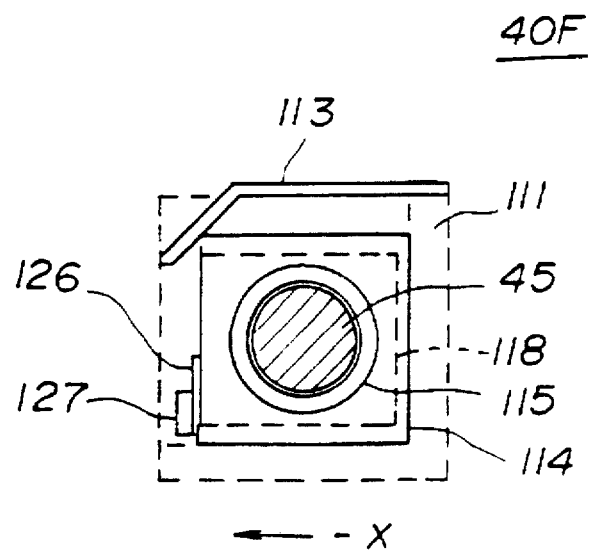
FIG. 18B is a side view of the laser diode module shown in FIG. 18A.
Figure 18C:
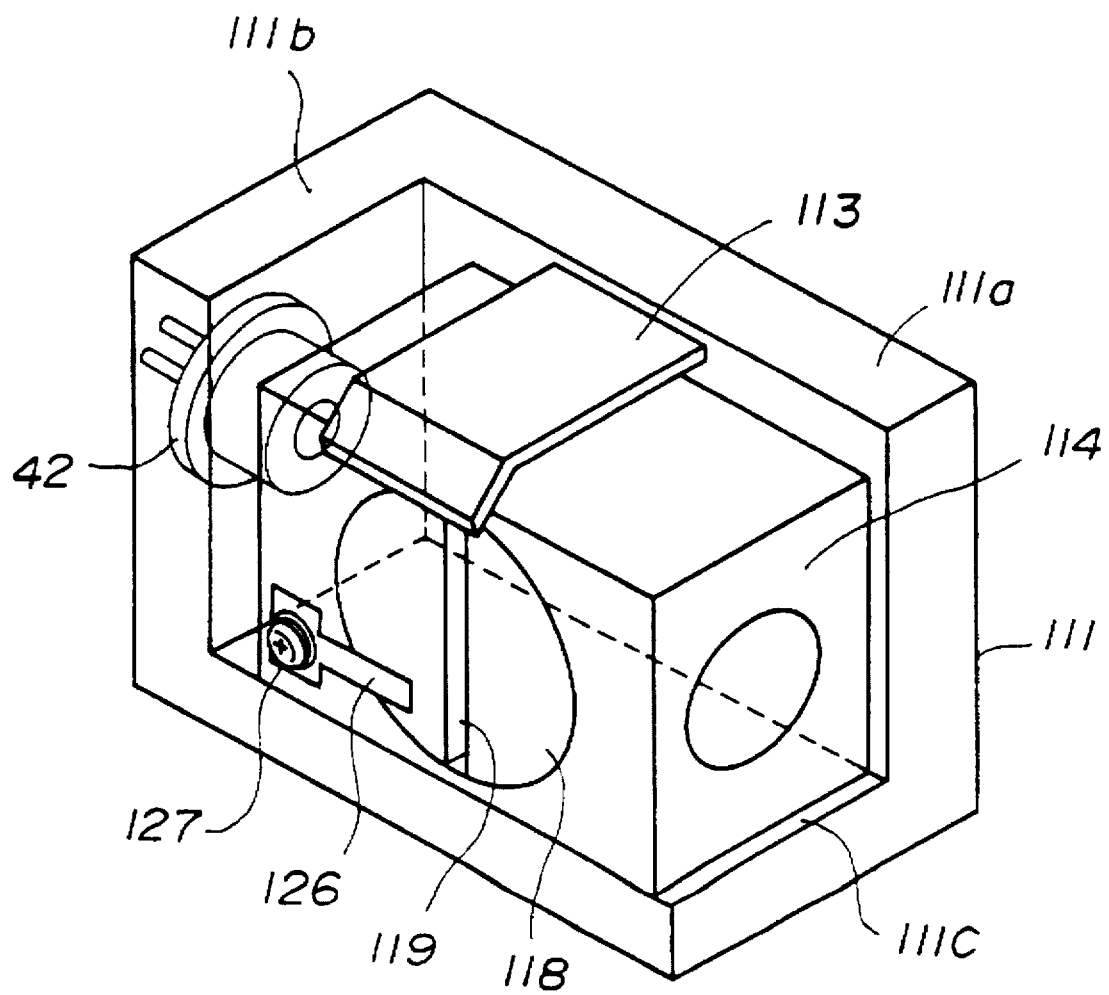
FIG. 18C is a perspective view of the laser diode module shown in FIGS. 18A and 18B.

A description will now be given, with reference to FIGS. 18A, 18B and 18C, of a first variation 40F of the laser diode module 40E according to the sixth embodiment of the present invention. In FIGS. 18A through 18C, parts that are the same as those shown in FIGS. 17A through 17C are given the same reference numbers.

The laser diode module 40F shown in FIGS. 18A through 18C has a leaf spring 126 fastened to the holder 114 by means of a male screw 127. The leaf spring 126 presses the lens holder 118 against the first vertical portion ilia of the base 111. Thereby, a deviation of the lens holder 118 and the lens 45 in the direction perpendicular to the optical axis of the laser diode 42 can be prevented.

Figure 19A:
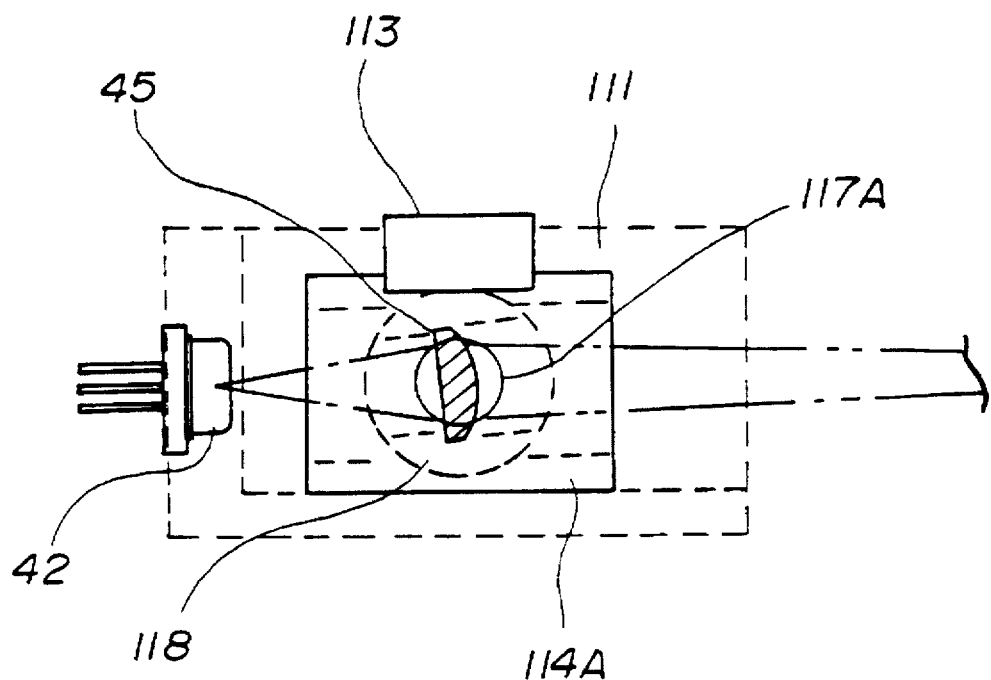
FIG. 19A is a front view of a second variation of the laser diode module shown in FIGS. 17A through 17C.
Figure 19B:
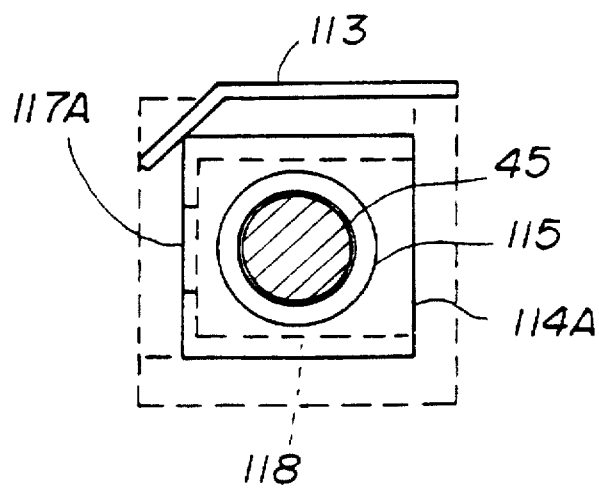
FIG. 19B is a side view of the laser diode module shown in FIG. 19A.
Figure 19C:
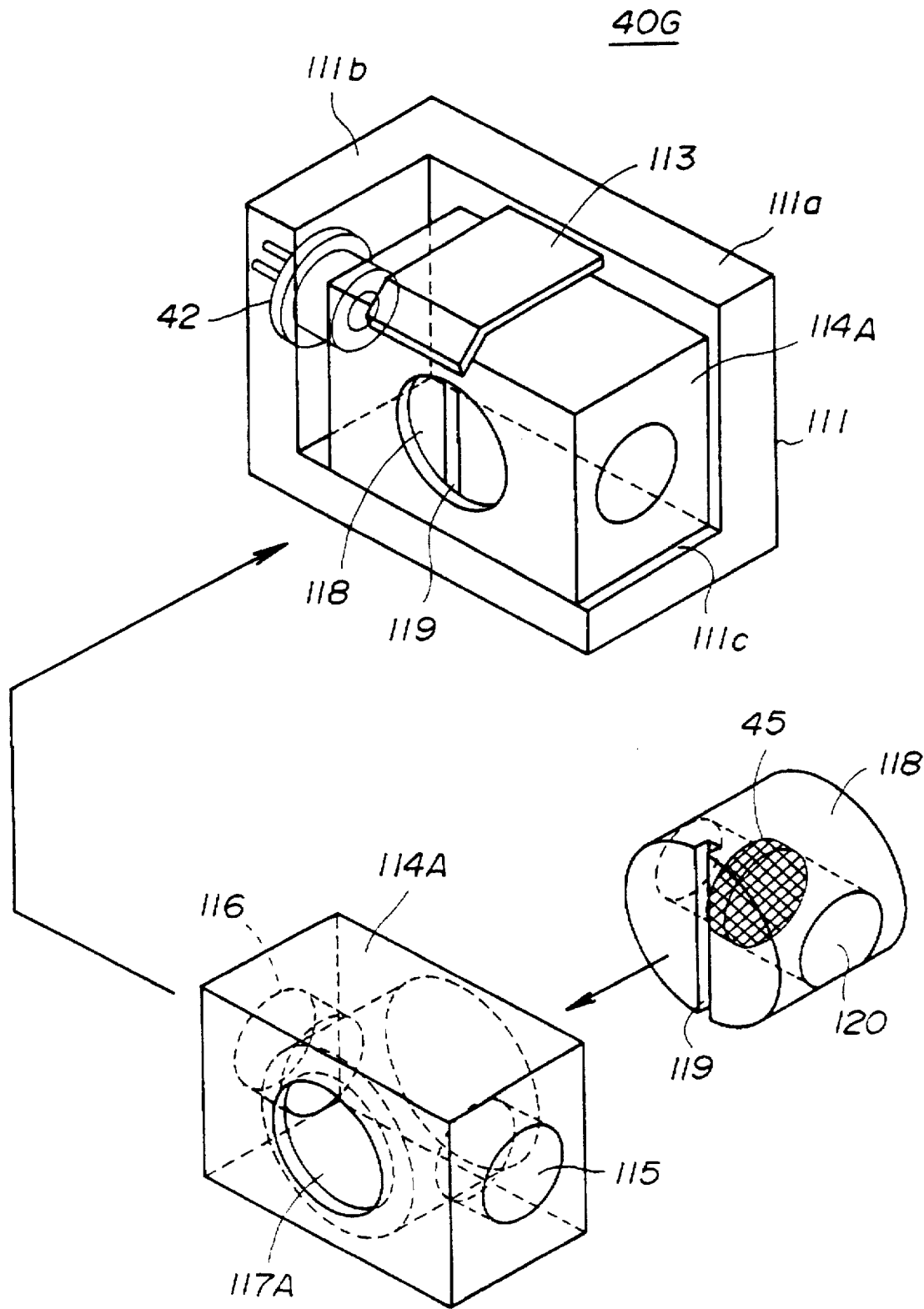
FIG. 19C is a perspective view of the laser diode module shown in FIGS. 19A and 19B.

FIGS. 19A, 19B and 19C illustrate a second variation 40G of the laser diode module 40E according to the sixth embodiment of the present invention. In FIGS. 19A through 19C, parts that are the same as those shown in the previously described figures are given the same reference numbers.

The laser diode module 40G has a holder 114A having a through hole 117A and the aforementioned holes 115 and 116. The lens holder 118 is inserted into the through hole 117A from the side of the holder 114A which is to come into contact with the first vertical portion 111a of the base 111. The diameter of the through hole 117A on the outside thereof is less than the diameter of the lens holder 118. Hence, a circular edge portion of the lens holder 118 comes into contact with an inner wall of the through hole 117A of the holder 114A. In the state in which the holder 114A, with the lens holder 118 inserted therein, is placed on the holder mounting surface 111c as shown in FIG. 19C, the leaf spring 113 presses the holder 114A against the first vertical portion 111a of the base 111 in such a state in which an end surface of the lens holder 118 opposite to the groove is in pressure contact with the first vertical portion 111a of the base 111. Hence, it is possible to deviate the lens holder 118 and the lens 45 from the predetermined position at which the optical axis of the laser diode 42 matches the optical axis of the lens 45. The vertical-direction focal point can be adjusted by turning the lens holder 118 by means of an instrument.

Figure 20A:
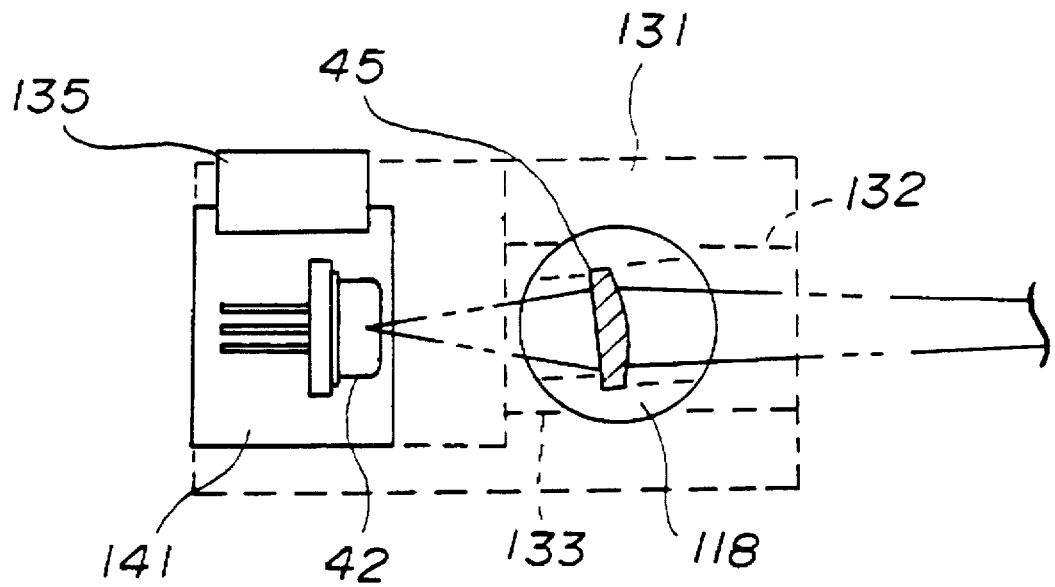
FIG. 20A is a front view of a third variation of the laser diode module shown in FIGS. 17A through 17C.
Figure 20B:
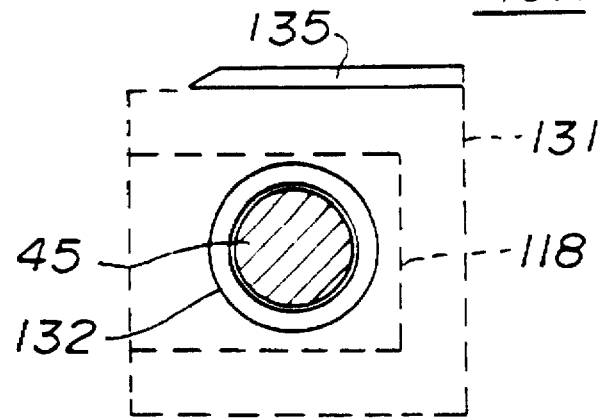
FIG. 20B is a side view of the laser diode module shown in FIG. 20B.
Figure 20C:
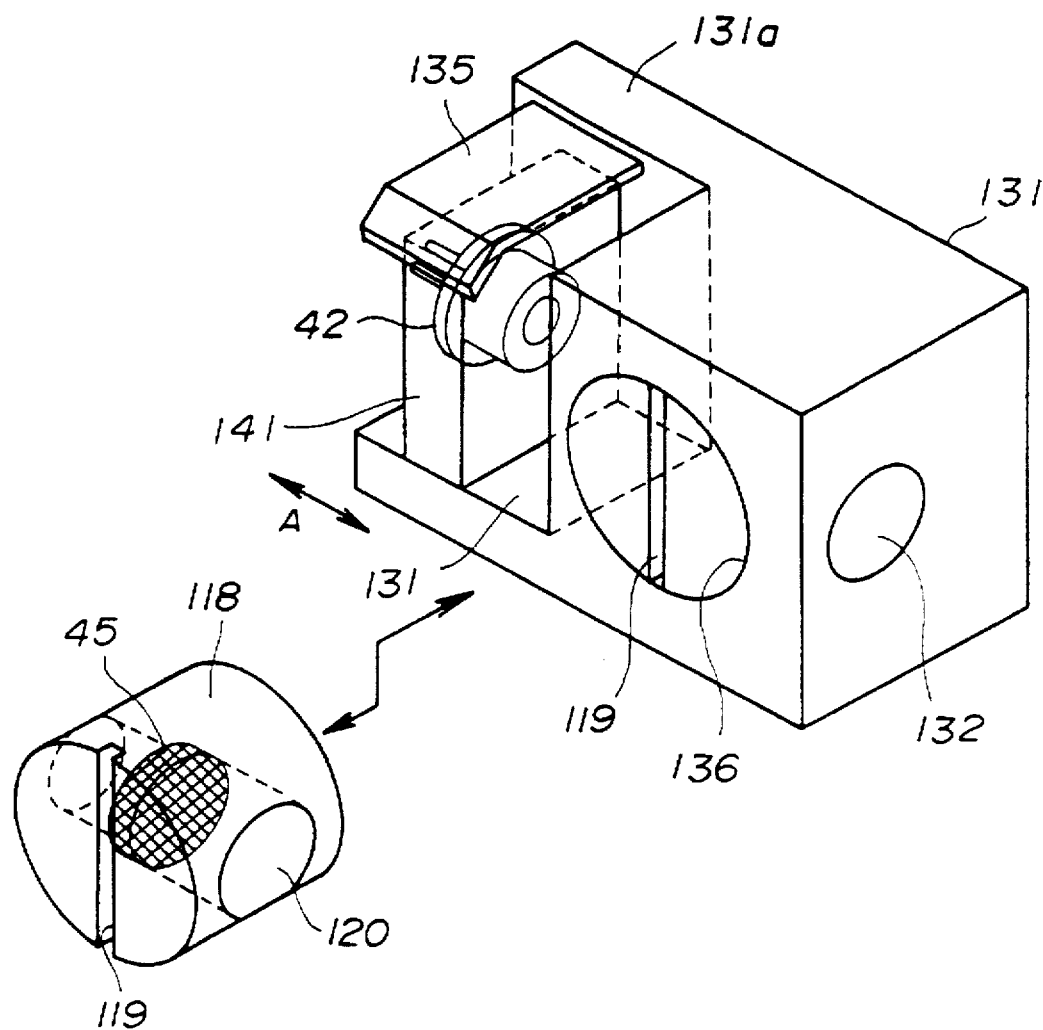
FIG. 20C is a perspective view of the laser diode module shown in FIGS. 20A and 20B.

A description will now be given, with reference to FIGS. 20A, 20B and 20C, of a third variation 40H of the laser diode module 40E according to the sixth embodiment of the present invention. In FIGS. 20A, 20B and 20C, parts that are the same as those shown in the previously described figures are given the same reference numbers.

The laser diode module 40H shown in Figs. 20A, 20B and 20C has a base 131 having a hole 136 into which the lens holder 118 is inserted. A hole 132 is joined to the hole 120 of the lens holder 118 when the lens holder 118 is inserted into the hole 136 and placed in a position. As shown in FIG. 20A, a hole 133 is formed in the base 131 so that it receives the laser beam emitted from the laser diode 42. The base 131 has a laser diode holder accommodating space defined by a vertical portion 131a and a laser diode holder mounting surface 131b. A block-shaped laser diode holder 141, which is slidable on the mounting surface 131b in the direction A, holds the laser diode 42. A leaf spring 135, having an end embedded in the vertical portion 131a of the base 131, engages an edge of the holder 141 and presses it against the vertical portion 131a. The horizontal-direction focal point can be adjusted by moving the laser diode holder 141 in the direction A. The vertical-distance focal point can be adjusted by turning the lens holder 118.

The present invention is not limited to the specifically described embodiments and variations, and other variations and modifications may be made without departing from the scope of the present invention.

What is claimed is:

1. A laser diode module comprising:

a base defining an upper planar mounting surface;

a laser diode supported by the base and emitting a laser beam along an optical axis parallel to the mounting surface;

a collimating lens supported by the base and disposed on the optical axis; and a holder holding a corresponding one of the laser diode and the collimating lens and having a lower planar mounting surface received on the upper planar mounting surface of the base and selectively and adjustably movable along the optical axis relatively to the upper planar mounting surface of the base, and to the other of the laser diode and the collimating lens, to a position at a distance between the lens and the laser diode along the optical axis selected to minimize the beam size in one of horizontal and vertical directions relative to the optical axis.

2. The laser diode module as claimed in claim 1, wherein the holder holds the lens for movement therewith relatively to the mounting surface of the base and so that a tilt angle the lens with respect to the optical axis can be adjusted.

3. The laser diode module as claimed in claim 2, further comprising:

a mechanism which tilts the lens holder with respect to the mounting surface of the base so that the lens is tilted with respect to the optical axis.

4. The laser diode module as claimed in claim 3, wherein said mechanism comprises:

a first screw rotatably holding the lens holder mounted on the mounting surface of the base; and a second screw penetrating the lens holder and having an end which projects from the lens holder and comes into contact with the mounting surface of the base.

5. The laser diode module as claimed in claim 3, wherein said mechanism comprises:

a first screw rotatably holding the lens holder mounted on the mounting surface of the base; and a second screw penetrating the base and having an end which projects from the mounting surface of the base and comes into contact with the lens holder.

6. The laser diode module as claimed in claim 3, further comprising a leaf spring supported by the base and engaged with the lens holder, said leaf spring pressing the lens holder against the base.

7. The laser diode module as claimed in claim 3, wherein said base has a stationary portion holding the laser diode.

8. The laser diode module as claimed in claim 4, wherein:

the base has an elongated slot therein through which the first screw is inserted, the slot being of a length relative to the optical axis to permit movement thereof.

9. The laser diode module as claimed in claim 1, wherein:

the base further comprises a holding portion which holds the laser diode at a fixed position relatively to the mounting surface;

the holder comprises a lens holder having a first portion and a second portion opposite to and spaced from the first portion via a slit and a screw passing through the second portion and coming into contact with the first portion via the slit, wherein:

the first portion of the lens holder holds the lens; and the first portion of the lens holder is bent by turning the screw so that a tilt angle of the lens with respect to the optical axis along which the laser beam is propagated can be adjusted.

10. The laser diode module as claimed in claim 1, wherein the first portion of the lens holder has a groove facilitating bending of the first portion.

11. The laser diode module as claimed in claim 1, wherein:

the base further comprises a holding portion which holds the laser diode at a fixed position relatively to the mounting surface;

the holder comprises a lens holder having a first portion and a second portion opposite to and spaced from the first portion via a slit, the second portion having a projection located above the slit, a wedge engaging the slit and a screw passing through the projection of the second portion and coming into contact with the wedge, wherein:

the first portion of the lens holder holds the lens; and the first portion of the lens holder is bent by turning the screw so that a tilt angle of the lens with respect to the optical axis can be adjusted.

12. The laser diode module as claimed in claim 1, wherein:

the base further comprises a holding portion which holds the laser diode at a fixed position relatively to the mounting surface;

the holder comprises a lens holder having a first portion and a second portion opposite to the first portion via a slit and a rod provided in the slit and coming into contact with the first and second portions, said rod having an oval cross-section, wherein:

the first portion of the lens holder holds the lens; and the first portion of the lens holder is bent by turning the rod so that a tilt angle of the lens with respect to the optical axis along which the laser beam is propagated can be adjusted.

13. The laser diode module as claimed in claim 9, further comprising a leaf spring supported by the base and engaged with the lens holder, said leaf spring pressing the lens holder against the base.

14. The laser diode module as claimed in claim 13, wherein:

the base further comprises a vertical portion;

the lens holder has a slope portion; and the leaf spring has a bent portion engaging the slope portion of the lens so that the lens holder is pressed against the vertical portion of the lens holder and the mounting surface thereof.

15. The laser diode module as claimed in claim 1, wherein:

the base further comprises a holding portion which holds the lens so that a tilt angle of the lens with respect to the optical axis can be adjusted; and the holder comprises a laser diode holder which holds the laser diode and is slidably mounted on the mounting surface of the base.

16. The laser diode module as claimed in claim 15, wherein:

the base further comprises a first portion and a second portion opposite to and spaced from the first portion via a slit and a screw passing through the second portion and coming into contact with the first portion via the slit and wherein:

the first portion of the base holds the lens; and the first portion of the base is bent by turning the screw so that a tilt angle of the lens with respect to the optical axis along which the laser beam is propagated can be adjusted.

17. The laser diode module as claimed in claim 1, wherein:

the base further comprises a portion holding the laser diode; and the holder comprises a first lens holder holding the lens and a second holder slidably mounted on the mounting surface of the base, wherein:

the first lens holder has a first through hole in which the lens is placed;

the second holder has a second hole into which the first lens holder is inserted, and two third holes joined to the first through hole and formed on respective sides of the first through hole; and the laser beam emitted from the laser diode is propagated through one of the two third holes, a part of the second hole, the lens, a remaining part of the second hole, and the other one of the two third holes.

18. The laser diode module as claimed in claim 17, wherein:

the first lens holder has a cylindrical shape;

the second hole has a cylindrical shape corresponding to the cylindrical shape of the first lens holder; and the first lens holder has a groove into which an instrument is to be inserted by turning the first lens holder.

19. The laser diode module as claimed in claim 17, further comprising a leaf spring having a first end fixed to the base, and a second end engaged with the second holder, so that the second holder is pressed against the base.

20. The laser diode module as claimed in claim 17, further comprising a leaf spring having a first end fixed to the second holder, and a second end engages with the first lens holder, so that the first lens holder is pressed against the base.

21. The laser diode module as claimed in claim 17, wherein one end of the first through hole has a first diameter less than a second diameter of the first lens holder, so that the first lens holder comes into contact with an inner wall of the first through hole defining the first diameter.

22. The laser diode module as claimed in claim 1, further comprising:

a first through hole and two second through holes in the base, the second through holes being joined to the first through hole and formed on respective sides of the first through hole;

a lens holder inserted into the first through hole; and a laser diode holder which holds the laser diode and is slidably mounted on the mounting surface of the base, wherein:

the lens holder has a third through hole in which the lens is placed; and the laser beam emitted from the laser diode is propagated through one of the two second through holes, a part of the third through hole, the lens, a remaining part of the third through hole, and the other one of the two second through holes.

23. The laser diode module as claimed in claim 22, wherein:

the lens holder has a cylindrical shape;

the first hole has a cylindrical shape corresponding to the cylindrical shape of the first lens holder; and the lens holder has a groove into which an instrument is to be inserted by turning the lens holder.

24. A laser diode module as recited in claim 1, further comprising:

a mounting surface on the base; and a holder holding the movable one of the laser diode and the collimating lens and slidably mounted on the mounting surface of the base and selectively and adjustably moveable, relatively to the mounting surface of the base along the optical axis.

25. The laser diode module as claimed in claim 24, wherein:

the holder holds the laser diode and is slidably mounted on the mounting surface of the base.

26. The laser diode module as claimed in claim 25, further comprising a mechanism which tilts the lens holder with respect to the mounting surface of the base so that the lens is tilted with respect to the optical axis.

27. A laser diode module as recited in claim 1, wherein: the collimating lens receives the laser beam and converges the laser beam passing therethrough so as to define a vertical beam waist at a corresponding first axial position along the optical axis and a horizontal beam waist at a corresponding second axial position along the optical axis; and the distance between the collimating lens and the laser diode is selected to minimize the size of the horizontal beam waist at the second axial position; and the collimating lens is disposed at an angle, relatively to the optical axis, selected to produce a minimum vertical beam waist, and thereby a minimum beam size, at the second axial position.

28. A laser diode module as recited in claim 1, further comprising:

a mounting surface on the base;

a lens holder holding the collimating lens;

a laser diode holder holding the laser diode; and each of the lens holder and the laser diode holder being slidably mounted on the mounting surface of the base and selectively and adjustably movable relatively to the mounting surface of the base along the optical axis.

29. A laser diode module as recited in claim 1, wherein:

the base further comprises a wall portion transverse to the mounting surface and disposed at an end of the mounting surface relatively to the optical axis and having a mount thereon aligned with the optical axis; and the laser diode is received and supported in the mount of the wall portion, aligned with the optical axis.

30. A laser diode module as recited in claim 1, wherein the base further comprises:

a first portion defining a mounting surface; and a second portion defining a guiding surface which is transverse to the mounting surface and parallel to the optical axis.

31. A laser diode module comprising:

a base defining an upper planar mounting surface;

a laser diode supported by the base and emitting a laser beam along an optical axis parallel to the upper planar mounting surface;

a collimating lens supported by the base and disposed on the optical axis; and a holder holding a corresponding one of the laser diode and the collimating lens and having a lower planar mounting surface received on the upper planar mounting surface of the base and selectively and adjustably movable along the optical axis, relatively to the upper planar mounting surface of the base and to the other of the laser diode and the collimating lens, to a selected distance between the lens and the laser diode along the optical axis minimizing the beam size in one of horizontal and vertical directions relative to the optical axis.

* * * * *

UNITED STATES PATENT AND TRADEMARK OFFICE
CERTIFICATE OF CORRECTION

PATENT NO. : 5,633,761
DATED : May 27, 1997
INVENTOR(S) : TAKASHIMA et al.

It is certified that error appears in the above-identified patent and that said Letters Patent is hereby corrected as shown below:

Col. 8, line 38, change "ilia" to --111a--.

Col. 9, line 50 (Claim 2, line 3), after "tilt angle" insert --of--.

Col. 11, lines 22-23 (Claim 16, lines 5-6), after "slit" continue with "and a" (paragraph should not be split).

Col. 12, line 46 (Claim 27, line 2), start a new paragraph with "the collimating lens".

Signed and Sealed this

Second Day of September, 1997

Attest:

BRUCE LEHMAN

*Attesting Officer*  *Commissioner of Patents and Trademarks*